United States Patent
Stockhammer

(10) Patent No.: US 11,706,502 B2
(45) Date of Patent: *Jul. 18, 2023

(54) SEGMENT TYPES AS DELIMITERS AND ADDRESSABLE RESOURCE IDENTIFIERS

(71) Applicant: QUALCOMM Incorporated, San Diego, CA (US)

(72) Inventor: Thomas Stockhammer, Bergen (DE)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/645,432

(22) Filed: Dec. 21, 2021

(65) Prior Publication Data

US 2022/0116691 A1    Apr. 14, 2022

Related U.S. Application Data

(60) Continuation of application No. 17/143,875, filed on Jan. 7, 2021, now Pat. No. 11,223,883, which is a
(Continued)

(51) Int. Cl.
  *H04N 21/854* (2011.01)
  *H04N 21/235* (2011.01)
  (Continued)

(52) U.S. Cl.
  CPC ..... *H04N 21/85406* (2013.01); *H04L 65/612* (2022.05); *H04L 65/65* (2022.05);
  (Continued)

(58) Field of Classification Search
  CPC ........... H04N 21/85406; H04N 21/235; H04N 21/84; H04N 21/845
  See application file for complete search history.

(56) References Cited

U.S. PATENT DOCUMENTS 8,755,672 B2 * 6/2014 Kim .................. G11B 27/329
  386/248
10,136,146 B1  11/2018 Wu et al.
(Continued)

FOREIGN PATENT DOCUMENTS

CN   101647280 A   2/2010
CN   101971639 A   2/2011
(Continued)

OTHER PUBLICATIONS

Hughes K., et al., "Common Media Application Format for Segmented Media", 3GPP Draft, International Organisation for Standardisation, 29N159922, 3rd Generation Partnership Project (3GPP), Mobile Competence Centre, 650, Route Des Lucioles, F-06921 Sophia-Antipolis Cedex, France, vol. SA WG4, No. Sophia Antipolis, France; Jun. 29, 2016 (Jun. 29, 2016), JTC1/SC29/WG11, 110 Pages, XP051122443, Retrieved from the Internet: URL: http://www.3gpp.org/ftp/tsg_sa/WG4_CODEC/TSGS4_89/Docs/ [retrieved on Jun. 29, 2016], Annex G.
(Continued)

*Primary Examiner* — Mohamed A. Wasel
*Assistant Examiner* — Linh T. Nguyen
(74) *Attorney, Agent, or Firm* — Shumaker & Sieffert, P.A.

(57) ABSTRACT

An example device for processing media data is configured to parse a bitstream including the media data, the bitstream being formatted according to Common Media Application Format (CMAF), detect, during the parsing, a file type (FTYP) value for a CMAF track file of the bitstream, determine that a CMAF header of the CMAF track file starts with the FTYP value, and process one or more CMAF fragments following the CMAF header of the CMAF track file. The device may additionally be configured to detect one or more segment type (STYP) values in the bitstream,
(Continued)

determine that each of the one or more STYP values corresponds to a start of a respective one of the CMAF fragments, and process each of the CMAF fragments starting from the corresponding STYP value.

20 Claims, 13 Drawing Sheets

Related U.S. Application Data division of application No. 15/943,399, filed on Apr. 2, 2018, now Pat. No. 10,924,822.

(60) Provisional application No. 62/481,594, filed on Apr. 4, 2017.

(51) Int. Cl.
| | |
|---|---|
| *H04N 21/84* | (2011.01) |
| *H04L 67/02* | (2022.01) |
| *H04N 21/236* | (2011.01) |
| *H04N 21/434* | (2011.01) |
| *H04L 69/22* | (2022.01) |
| *H04L 65/65* | (2022.01) |
| *H04L 65/612* | (2022.01) |
| *H04N 21/845* | (2011.01) |

(52) U.S. Cl.
CPC .............. *H04L 67/02* (2013.01); *H04L 69/22* (2013.01); *H04N 21/235* (2013.01); *H04N 21/23614* (2013.01); *H04N 21/4348* (2013.01); *H04N 21/84* (2013.01); *H04N 21/845* (2013.01); *H04N 21/8456* (2013.01)

(56) References Cited

U.S. PATENT DOCUMENTS

| | | | |
|---|---|---|---|
| 10,158,894 | B2 | 12/2018 | Nair et al. |
| 10,924,822 | B2 | 2/2021 | Stockhammer |
| 2008/0320100 | A1* | 12/2008 | Batson ................... H04L 65/60 709/217 |
| 2012/0185607 | A1 | 7/2012 | Rhyu et al. |
| 2012/0188335 | A1 | 7/2012 | Lee, III et al. |
| 2013/0083848 | A1 | 4/2013 | Joch et al. |
| 2014/0032777 | A1 | 1/2014 | Yuan et al. |
| 2016/0014480 | A1 | 1/2016 | Maze et al. |
| 2016/0127798 | A1 | 5/2016 | Yamagishi |
| 2016/0165321 | A1 | 6/2016 | Denoual et al. |
| 2016/0234144 | A1* | 8/2016 | Hannuksela ........... H04N 19/00 |
| 2016/0234536 | A1 | 8/2016 | Stockhammer et al. |
| 2017/0134539 | A1* | 5/2017 | Park ........................ H04L 69/22 |
| 2017/0171610 | A1 | 6/2017 | Nair et al. |
| 2018/0103271 | A1 | 4/2018 | Wang et al. |
| 2018/0160155 | A1 | 6/2018 | Iguchi et al. |
| 2018/0199071 | A1 | 7/2018 | Wang et al. |
| 2018/0199075 | A1 | 7/2018 | Wang et al. |
| 2018/0367227 | A1 | 12/2018 | Lee et al. |
| 2020/0014988 | A1 | 1/2020 | Navali et al. |
| 2021/0127182 | A1 | 4/2021 | Stockhammer |

FOREIGN PATENT DOCUMENTS

| | | |
|---|---|---|
| CN | 102232298 A | 11/2011 |
| CN | 103314579 A | 9/2013 |
| CN | 105723718 A | 6/2016 |
| EP | 2424239 A2 | 2/2012 |

OTHER PUBLICATIONS

Hughes K., et al., "Study of DIS of ISO/IEC 23000-19 Common Media Applications Format for Segmented Media", Draft Feb. 4, 2017, ISO/IEC JTC1/SC29/WG11 MPEG117/N16632, Jan. 2017, Geneva, Switzerland, 131 Pages.

International Search Report and Written Opinion—PCT/US2018/025868—ISA/EPO—dated Jun. 21, 2018, 16 pp.

International Standard ISO/IEC 14496-12, Information Technology—Coding of audio-visual objects—Part 12: ISO base media file format, Third Edition, Oct. 15, 2008, 120 pp.

Iso: "ISO/IEC 14496-12 Information Technology—Coding of Audio-Visual Objects—Part 12: ISO Base Media File Format", 5th Edition, Dec. 15, 2015, XP055836373, 248 Pages.

ITU-T H.265: "Series H: Audiovisual and Multimedia Systems, Infrastructure of Audiovisual Services—Coding of Moving Video, High Efficiency Video Coding", The International Telecommunication Union, Jun. 2019, 696 Pages.

"ITU-T H.265, Series H: Audiovisual and Multimedia Systems, Infrastructure of Audiovisual Services—Coding of Moving Video, High Efficiency Video Coding", The International Telecommunication Union, Apr. 2015, 634 Pages, please consider section 7.4.9.6 on p. 102, section 8.5.3.2.6 on p. 141, section 8.5.3.2.7 on pp. 141-145, and section 8.5.3.2.8 on p. 145.

Masinter L., et al., "Hypertext Transfer Protocol—HTTP/1.1", Hypertext Transfer Protocol—HTTP/1.1; rfc2616.txt, 19990601 Internet Engineering Task Force, IETF; Standard, Internet Society (ISOC) 4, rue des Falaises CH—1205 Geneva, Switzerland, 19990601, Jun. 1, 1999 (Jun. 1, 1999), XP015008399, pp. 1-177, ISSN: 0000-0003, Chapter 3.6 "Transfer Codings".

Paila T., et al., "Flute—File Delivery Over Unidirectional Transport", Flute—File Delivery over Unidirectional Transport, rfc6726.txt, Internet Engineering Task Force (IETF), Standard Track, Internet Society (ISOC) 4, Rue Des Falaises CH—1205 Geneva, Switzerland, Nov. 6, 2012 (Nov. 6, 2012), XP015086468, pp. 1-46, http://tools.ietf.org/html/rfc6726, [retrieved on Nov. 6, 2012], p. 3, line 30—p. 27, line 12.

Qualcomm Incorporated: "Corrections for 3GP File Format to Support Adaptive Streaming," 3GPP TSG-SA4 #60, S4-100713, CR 26.244-0033, (Release 9), Erlangen, Germany, Aug. 16-20, 2010, Aug. 25, 2010, 12 pages.

"Requirements for the Common Media Application Format", International Organisation for Standardisation, ISO/IEC JTC1/SC29/WG11, Coding of Moving Pictures and Audio, MPEG 2016/N16144, Feb. 2016, 4 Pages.

Stockhammer T., "Dash and CMAF: Referencing Common Segment Formats", 117, MPEG Meeting, Jan. 16, 2017-Jan. 20, 2017, Geneva, (Motion Picture Expert Group or ISO/IEC JTC1/SC29/WG11), No. m39926, Jan. 12, 2017, XP030068271, 11 Pages, Retrieved from the Internet: URL: http://phenix.int-evry.fr/mpeg/doc_end_user/documents/117_Geneva/wg11/m39926-v1-m39926_CMAF_Referencing.zip, m39926-CMAF-Referencing.docx, [retrieved on Jan. 12, 2017], The whole document.

"What's New in HTTP Live Streaming", WWDC 2016, Session 504, retrieved from https://developer.apple.com/videos/play/wwdc2016/504/, Jul. 24, 2018, 1 PP.

Zia W., et al., "CMAF Conformance Checks," 118, MPEG Meeting; Mar. 4, 2017-Jul. 4, 2017; Hobart; (Motion Picture Expert Group or ISO/IEC JTC1/SC29/WG11),, No. m40598, Mar. 30, 2017, XP030068943, 84 pages.

\* cited by examiner

SEGMENT TYPES AS DELIMITERS AND ADDRESSABLE RESOURCE IDENTIFIERS

This application is a continuation of U.S. application Ser. No. 17/143,875, filed Jan. 7, 2021, which is a divisional of U.S. application Ser. No. 15/943,399, filed Apr. 2, 2018, which claimed the benefit of U.S. Provisional Application No. 62/481,594, filed Apr. 4, 2017, the entire contents of which are hereby incorporated by reference.

TECHNICAL FIELD

This disclosure relates to storage and transport of media data.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263 or ITU-T H.264/MPEG-4, Part 10, Advanced Video Coding (AVC), ITU-T H.265 (also referred to High Efficiency Video Coding (HEVC)), and extensions of such standards, to transmit and receive digital video information more efficiently.

After media data has been encoded, the media data may be packetized for transmission or storage. The media data may be assembled into a video file conforming to any of a variety of standards, such as the International Organization for Standardization (ISO) base media file format and extensions thereof, such as AVC.

SUMMARY

In general, this disclosure describes techniques for using data types (e.g., segment types and/or file types) as delimiters, type indicators, and delivery indicators. These techniques may allow use of these data types in a flexible, simple fashion to provide any or all of these indications. In this manner, generated content may be used in different delivery and/or consumption environments, but also allow for packaging as discussed in greater detail below.

In one example, a method of processing media data includes parsing, by a processor implemented in circuitry, a bitstream including data formatted according to Common Media Application Format (CMAF), detecting, by the processor and during the parsing, a file type (FTYP) value for a CMAF track file of the bitstream, determining, by the processor, that a CMAF header of the CMAF track file starts with the FTYP value, and processing, by the processor, one or more CMAF fragments following the CMAF header of the CMAF track file.

In another example, a device for processing media data includes a memory for storing media data; and one or more processors implemented in circuitry and configured to: parse a bitstream including the media data, the bitstream being formatted according to Common Media Application Format (CMAF); detect, during the parsing, a file type (FTYP) value for a CMAF track file of the bitstream; determine that a CMAF header of the CMAF track file starts with the FTYP value; and process one or more CMAF fragments following the CMAF header of the CMAF track file.

In another example, a device for processing media data includes means for parsing a bitstream including data formatted according to Common Media Application Format (CMAF); means for detecting, during the parsing, a file type (FTYP) value for a CMAF track file of the bitstream; means for determining that a CMAF header of the CMAF track file starts with the FTYP value; and means for processing one or more CMAF fragments following the CMAF header of the CMAF track file.

In another example, a computer-readable storage medium (which may be non-transitory) has stored thereon instructions that, when executed, cause a processor to parse a bitstream including data formatted according to Common Media Application Format (CMAF); detect, during the parsing, a file type (FTYP) value for a CMAF track file of the bitstream; determine that a CMAF header of the CMAF track file starts with the FTYP value; and process one or more CMAF fragments following the CMAF header of the CMAF track file.

In another example, a method of generating a bitstream including media data includes generating, by a processor implemented in circuitry, a Common Media Application Format (CMAF) header of a CMAF track file; setting, by the processor, a value for a file type (FTYP) value of the CMAF header indicating the start of the CMAF header; encapsulating, by the processor, one or more samples of media data in one or more CMAF fragments following the CMAF header of the CMAF track file; and generating, by the processor, a bitstream including the CMAF header and the CMAF track file, the one or more CMAF fragments following the CMAF header in the CMAF track file.

In another example, a device for generating a bitstream including media data includes a memory configured to store media data; and one or more processors implemented in circuitry and configured to: generate, by a processor implemented in circuitry, a Common Media Application Format (CMAF) header of a CMAF track file for the media data; set a value for a file type (FTYP) value of the CMAF header indicating the start of the CMAF header; encapsulate one or more samples of the media data in one or more CMAF fragments following the CMAF header of the CMAF track file; and generate a bitstream including the CMAF header and the CMAF track file, the one or more CMAF fragments following the CMAF header in the CMAF track file.

In another example, a device for generating a bitstream including media data includes means for generating a Common Media Application Format (CMAF) header of a CMAF track file; means for setting a value for a file type (FTYP) value of the CMAF header indicating the start of the CMAF header; means for encapsulating one or more samples of media data in one or more CMAF fragments following the CMAF header of the CMAF track file; and means for generating a bitstream including the CMAF header and the CMAF track file, the one or more CMAF fragments following the CMAF header in the CMAF track file.

In another example, a computer-readable storage medium (which may be non-transitory) has stored thereon instructions that, when executed, cause a processor to generate a Common Media Application Format (CMAF) header of a CMAF track file; set a value for a file type (FTYP) value of the CMAF header indicating the start of the CMAF header; encapsulate one or more samples of media data in one or more CMAF fragments following the CMAF header of the CMAF track file; and generate a bitstream including the CMAF header and the CMAF track file, the one or more CMAF fragments following the CMAF header in the CMAF track file.

The details of one or more examples are set forth in the accompanying drawings and the description below. Other features, objects, and advantages will be apparent from the description and drawings, and from the claims.

DETAILED DESCRIPTION

Figure 1:
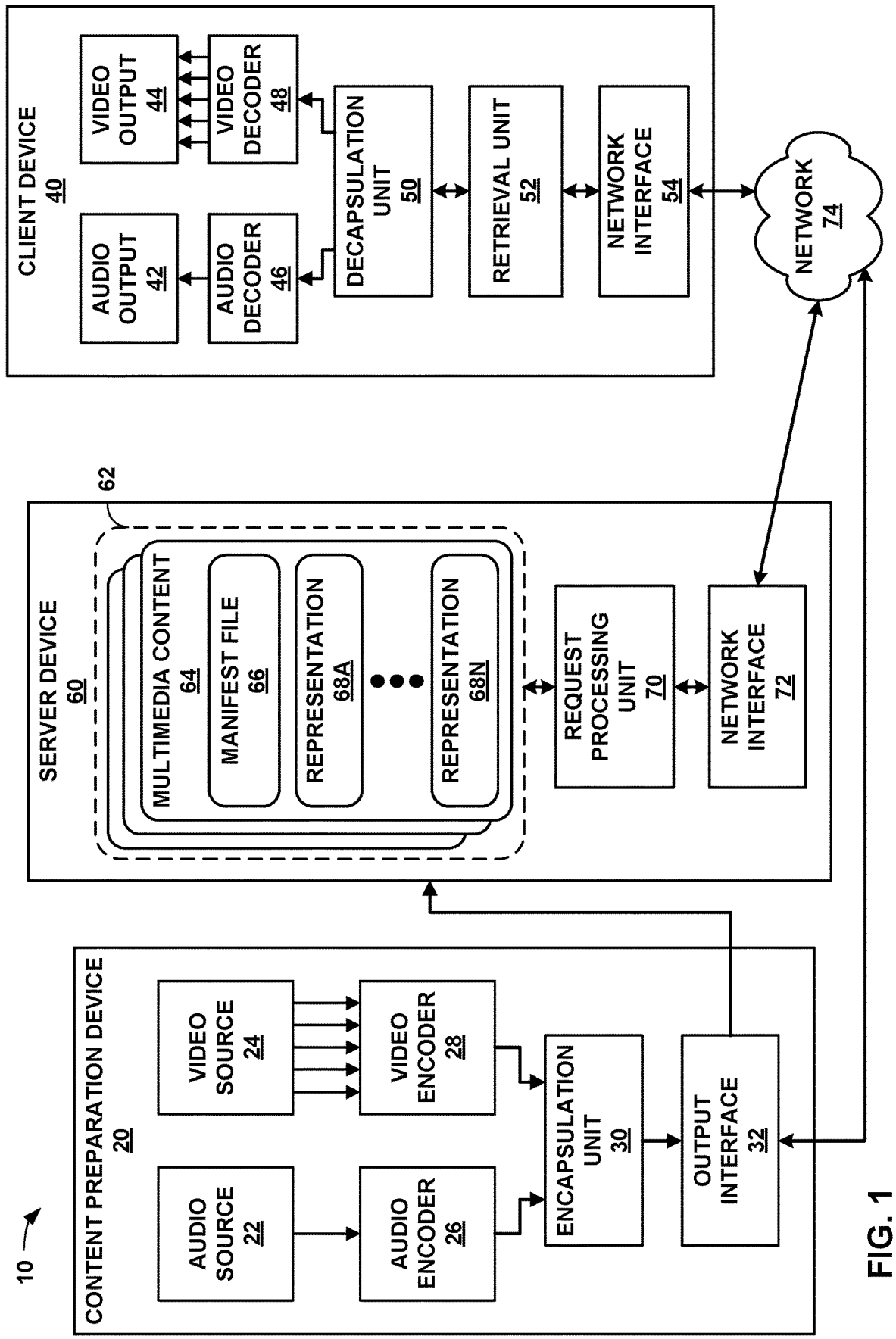
FIG. 1 is a block diagram illustrating an example system that implements techniques for streaming media data over a network.

In general, this disclosure describes techniques for using data types (e.g., segment types and/or file types) as delimiters, type indicators, and delivery indicators.

Dynamic Adaptive Streaming over HTTP (DASH) describes the use of segments as deliverable containers of media data (e.g., files with unique uniform resource locators (URLs)). Segments have a type, described by a "segment type" or "styp" syntax element. Files also have a file type, described by a "file type" or "ftyp" syntax element. Such syntax elements may form part of file format information according to, e.g., the ISO base media file format (ISO BMFF) or an extension of ISO BMFF.

A file conforming to ISO BMFF or an extension of ISO BMFF may further include media data formatted according to Common Media Application Format (CMAF). CMAF content is used in different stages: at the content preparation stage, at the delivery level, and at the content consumption stage (e.g., for an interface to a receiving device, such as a media source extension (MSE) interface).

In general, CMAF data structures are identified without a manifest file, such as a DASH media presentation description (MPD). After content preparation, delimiters are typically included in byte streams/files to identify the CMAF data structures. At the delivery level, types for delivered objects should be identifiable. As interfaces to playback engines, such as MSEs, data structures may be identified for extraction, e.g., to permit playback and switching across different CMAF tracks. In general, identification of CMAF data structures should be simple, and follow the CMAF structure.

The techniques of this disclosure may be applied to video files conforming to video data encapsulated according to any of ISO base media file format, Scalable Video Coding (SVC) file format, Advanced Video Coding (AVC) file format, Third Generation Partnership Project (3GPP) file format, and/or Multiview Video Coding (MVC) file format, or other similar video file formats.

In HTTP streaming, frequently used operations include HEAD, GET, and partial GET. The HEAD operation retrieves a header of a file associated with a given uniform resource locator (URL) or uniform resource name (URN), without retrieving a payload associated with the URL or URN. The GET operation retrieves a whole file associated with a given URL or URN. The partial GET operation receives a byte range as an input parameter and retrieves a continuous number of bytes of a file, where the number of bytes correspond to the received byte range. Thus, movie fragments may be provided for HTTP streaming, because a partial GET operation can get one or more individual movie fragments. In a movie fragment, there can be several track fragments of different tracks. In HTTP streaming, a media presentation may be a structured collection of data that is accessible to the client. The client may request and download media data information to present a streaming service to a user.

In the example of streaming 3GPP data using HTTP streaming, there may be multiple representations for video and/or audio data of multimedia content. As explained below, different representations may correspond to different coding characteristics (e.g., different profiles or levels of a video coding standard), different coding standards or extensions of coding standards (such as multiview and/or scalable extensions), or different bitrates. The manifest of such representations may be defined in a Media Presentation Description (MPD) data structure. A media presentation may correspond to a structured collection of data that is accessible to an HTTP streaming client device. The HTTP streaming client device may request and download media data information to present a streaming service to a user of the client device. A media presentation may be described in the MPD data structure, which may include updates of the MPD.

A media presentation may contain a sequence of one or more Periods. Each period may extend until the start of the next Period, or until the end of the media presentation, in the case of the last period. Each period may contain one or more representations for the same media content. A representation may be one of a number of alternative encoded versions of audio, video, timed text, or other such data. The representations may differ by encoding types, e.g., by bitrate, resolution, and/or codec for video data and bitrate, language, and/or codec for audio data. The term representation may be used to refer to a section of encoded audio or video data corresponding to a particular period of the multimedia content and encoded in a particular way.

Representations of a particular period may be assigned to a group indicated by an attribute in the MPD indicative of an adaptation set to which the representations belong. Representations in the same adaptation set are generally considered alternatives to each other, in that a client device can dynamically and seamlessly switch between these representations, e.g., to perform bandwidth adaptation. For example, each representation of video data for a particular period may be assigned to the same adaptation set, such that any of the representations may be selected for decoding to present media data, such as video data or audio data, of the multimedia content for the corresponding period. The media content within one period may be represented by either one representation from group 0, if present, or the combination of at most one representation from each non-zero group, in some examples. Timing data for each representation of a period may be expressed relative to the start time of the period.

A representation may include one or more segments. Each representation may include an initialization segment, or each segment of a representation may be self-initializing. When present, the initialization segment may contain initialization information for accessing the representation. In general, the initialization segment does not contain media data. A segment may be uniquely referenced by an identifier, such as a uniform resource locator (URL), uniform resource name (URN), or uniform resource identifier (URI). The MPD may provide the identifiers for each segment. In some examples, the MPD may also provide byte ranges in the form of a range attribute, which may correspond to the data for a segment within a file accessible by the URL, URN, or URI.

Different representations may be selected for substantially simultaneous retrieval for different types of media data. For example, a client device may select an audio representation, a video representation, and a timed text representation from which to retrieve segments. In some examples, the client device may select particular adaptation sets for performing bandwidth adaptation. That is, the client device may select an adaptation set including video representations, an adaptation set including audio representations, and/or an adaptation set including timed text. Alternatively, the client device may select adaptation sets for certain types of media (e.g., video), and directly select representations for other types of media (e.g., audio and/or timed text).

FIG. 1 is a block diagram illustrating an example system 10 that implements techniques for streaming media data over a network. In this example, system 10 includes content preparation device 20, server device 60, and client device 40. Client device 40 and server device 60 are communicatively coupled by network 74, which may comprise the Internet. In some examples, content preparation device 20 and server device 60 may also be coupled by network 74 or another network, or may be directly communicatively coupled. In some examples, content preparation device 20 and server device 60 may comprise the same device.

Content preparation device 20, in the example of FIG. 1, comprises audio source 22 and video source 24. Audio source 22 may comprise, for example, a microphone that produces electrical signals representative of captured audio data to be encoded by audio encoder 26. Alternatively, audio source 22 may comprise a storage medium storing previously recorded audio data, an audio data generator such as a computerized synthesizer, or any other source of audio data. Video source 24 may comprise a video camera that produces video data to be encoded by video encoder 28, a storage medium encoded with previously recorded video data, a video data generation unit such as a computer graphics source, or any other source of video data. Content preparation device 20 is not necessarily communicatively coupled to server device 60 in all examples, but may store multimedia content to a separate medium that is read by server device 60.

Raw audio and video data may comprise analog or digital data. Analog data may be digitized before being encoded by audio encoder 26 and/or video encoder 28. Audio source 22 may obtain audio data from a speaking participant while the speaking participant is speaking, and video source 24 may simultaneously obtain video data of the speaking participant. In other examples, audio source 22 may comprise a computer-readable storage medium comprising stored audio data, and video source 24 may comprise a computer-readable storage medium comprising stored video data. In this manner, the techniques described in this disclosure may be applied to live, streaming, real-time audio and video data or to archived, pre-recorded audio and video data.

Audio frames that correspond to video frames are generally audio frames containing audio data that was captured (or generated) by audio source 22 contemporaneously with video data captured (or generated) by video source 24 that is contained within the video frames. For example, while a speaking participant generally produces audio data by speaking, audio source 22 captures the audio data, and video source 24 captures video data of the speaking participant at the same time, that is, while audio source 22 is capturing the audio data. Hence, an audio frame may temporally correspond to one or more particular video frames. Accordingly, an audio frame corresponding to a video frame generally corresponds to a situation in which audio data and video data were captured at the same time and for which an audio frame and a video frame comprise, respectively, the audio data and the video data that was captured at the same time.

In some examples, audio encoder 26 may encode a timestamp in each encoded audio frame that represents a time at which the audio data for the encoded audio frame was recorded, and similarly, video encoder 28 may encode a timestamp in each encoded video frame that represents a time at which the video data for encoded video frame was recorded. In such examples, an audio frame corresponding to a video frame may comprise an audio frame comprising a timestamp and a video frame comprising the same timestamp. Content preparation device 20 may include an internal clock from which audio encoder 26 and/or video encoder 28 may generate the timestamps, or that audio source 22 and video source 24 may use to associate audio and video data, respectively, with a timestamp.

In some examples, audio source 22 may send data to audio encoder 26 corresponding to a time at which audio data was recorded, and video source 24 may send data to video encoder 28 corresponding to a time at which video data was recorded. In some examples, audio encoder 26 may encode a sequence identifier in encoded audio data to indicate a relative temporal ordering of encoded audio data but without necessarily indicating an absolute time at which the audio data was recorded, and similarly, video encoder 28 may also use sequence identifiers to indicate a relative temporal ordering of encoded video data. Similarly, in some examples, a sequence identifier may be mapped or otherwise correlated with a timestamp.

Audio encoder 26 generally produces a stream of encoded audio data, while video encoder 28 produces a stream of encoded video data. Each individual stream of data (whether audio or video) may be referred to as an elementary stream. An elementary stream is a single, digitally coded (possibly compressed) component of a representation. For example, the coded video or audio part of the representation can be an elementary stream. An elementary stream may be converted into a packetized elementary stream (PES) before being encapsulated within a video file. Within the same representation, a stream ID may be used to distinguish the PES-packets belonging to one elementary stream from the other. The basic unit of data of an elementary stream is a packetized elementary stream (PES) packet. Thus, coded video data generally corresponds to elementary video streams. Similarly, audio data corresponds to one or more respective elementary streams.

Many video coding standards, such as ITU-T H.264/AVC and the upcoming High Efficiency Video Coding (HEVC) standard, define the syntax, semantics, and decoding process for error-free bitstreams, any of which conform to a certain profile or level. Video coding standards typically do not specify the encoder, but the encoder is tasked with guaranteeing that the generated bitstreams are standard-compliant for a decoder. In the context of video coding standards, a "profile" corresponds to a subset of algorithms, features, or tools and constraints that apply to them. As defined by the H.264 standard, for example, a "profile" is a subset of the entire bitstream syntax that is specified by the H.264 standard. A "level" corresponds to the limitations of the decoder resource consumption, such as, for example, decoder memory and computation, which are related to the resolution of the pictures, bit rate, and block processing rate. A profile may be signaled with a profile_idc (profile indicator) value, while a level may be signaled with a level_idc (level indicator) value.

The H.264 standard, for example, recognizes that, within the bounds imposed by the syntax of a given profile, it is still possible to require a large variation in the performance of encoders and decoders depending upon the values taken by syntax elements in the bitstream such as the specified size of the decoded pictures. The H.264 standard further recognizes that, in many applications, it is neither practical nor economical to implement a decoder capable of dealing with all hypothetical uses of the syntax within a particular profile. Accordingly, the H.264 standard defines a "level" as a specified set of constraints imposed on values of the syntax elements in the bitstream. These constraints may be simple limits on values. Alternatively, these constraints may take the form of constraints on arithmetic combinations of values (e.g., picture width multiplied by picture height multiplied by number of pictures decoded per second). The H.264 standard further provides that individual implementations may support a different level for each supported profile.

A decoder conforming to a profile ordinarily supports all the features defined in the profile. For example, as a coding feature, B-picture coding is not supported in the baseline profile of H.264/AVC but is supported in other profiles of H.264/AVC. A decoder conforming to a level should be capable of decoding any bitstream that does not require resources beyond the limitations defined in the level. Definitions of profiles and levels may be helpful for interpretability. For example, during video transmission, a pair of profile and level definitions may be negotiated and agreed for a whole transmission session. More specifically, in H.264/AVC, a level may define limitations on the number of macroblocks that need to be processed, decoded picture buffer (DPB) size, coded picture buffer (CPB) size, vertical motion vector range, maximum number of motion vectors per two consecutive MBs, and whether a B-block can have sub-macroblock partitions less than 8×8 pixels. In this manner, a decoder may determine whether the decoder is capable of properly decoding the bitstream.

In the example of FIG. 1, encapsulation unit 30 of content preparation device 20 receives elementary streams comprising coded video data from video encoder 28 and elementary streams comprising coded audio data from audio encoder 26. In some examples, video encoder 28 and audio encoder 26 may each include packetizers for forming PES packets from encoded data. In other examples, video encoder 28 and audio encoder 26 may each interface with respective packetizers for forming PES packets from encoded data. In still other examples, encapsulation unit 30 may include packetizers for forming PES packets from encoded audio and video data.

Video encoder 28 may encode video data of multimedia content in a variety of ways, to produce different representations of the multimedia content at various bitrates and with various characteristics, such as pixel resolutions, frame rates, conformance to various coding standards, conformance to various profiles and/or levels of profiles for various coding standards, representations having one or multiple views (e.g., for two-dimensional or three-dimensional playback), or other such characteristics. A representation, as used in this disclosure, may comprise one of audio data, video data, text data (e.g., for closed captions), or other such data. The representation may include an elementary stream, such as an audio elementary stream or a video elementary stream. Each PES packet may include a stream_id that identifies the elementary stream to which the PES packet belongs. Encapsulation unit 30 is responsible for assembling elementary streams into video files (e.g., segments) of various representations.

Encapsulation unit 30 receives PES packets for elementary streams of a representation from audio encoder 26 and video encoder 28 and forms corresponding network abstraction layer (NAL) units from the PES packets. Coded video segments may be organized into NAL units, which provide a "network-friendly" video representation addressing applications such as video telephony, storage, broadcast, or streaming. NAL units can be categorized to Video Coding Layer (VCL) NAL units and non-VCL NAL units. VCL units may contain the core compression engine and may include block, macroblock, and/or slice level data. Other NAL units may be non-VCL NAL units. In some examples, a coded picture in one time instance, normally presented as a primary coded picture, may be contained in an access unit, which may include one or more NAL units.

Non-VCL NAL units may include parameter set NAL units and SEI NAL units, among others. Parameter sets may contain sequence-level header information (in sequence parameter sets (SPS)) and the infrequently changing picture-level header information (in picture parameter sets (PPS)). With parameter sets (e.g., PPS and SPS), infrequently changing information need not to be repeated for each sequence or picture, hence coding efficiency may be improved. Furthermore, the use of parameter sets may enable out-of-band transmission of the important header information, avoiding the need for redundant transmissions for error resilience. In out-of-band transmission examples, parameter set NAL units may be transmitted on a different channel than other NAL units, such as SEI NAL units.

Supplemental Enhancement Information (SEI) may contain information that is not necessary for decoding the coded pictures samples from VCL NAL units, but may assist in processes related to decoding, display, error resilience, and other purposes. SEI messages may be contained in non-VCL NAL units. SEI messages are the normative part of some standard specifications, and thus are not always mandatory for standard compliant decoder implementation. SEI messages may be sequence level SEI messages or picture level SEI messages. Some sequence level information may be contained in SEI messages, such as scalability information SEI messages in the example of SVC and view scalability information SEI messages in MVC. These example SEI messages may convey information on, e.g., extraction of operation points and characteristics of the operation points. In addition, encapsulation unit 30 may form a manifest file, such as a media presentation descriptor (MPD) that describes characteristics of the representations. Encapsulation unit 30 may format the MPD according to extensible markup language (XML).

Encapsulation unit 30 may provide data for one or more representations of multimedia content, along with the manifest file (e.g., the MPD) to output interface 32. Output interface 32 may comprise a network interface or an interface for writing to a storage medium, such as a universal serial bus (USB) interface, a CD or DVD writer or burner, an interface to magnetic or flash storage media, or other interfaces for storing or transmitting media data. Encapsulation unit 30 may provide data of each of the representations of multimedia content to output interface 32, which may send the data to server device 60 via network transmission or storage media. In the example of FIG. 1, server device 60 includes storage medium 62 that stores various multimedia contents 64, each including a respective manifest file 66 and one or more representations 68A-68N (representations 68). In some examples, output interface 32 may also send data directly to network 74.

In some examples, representations 68 may be separated into adaptation sets. That is, various subsets of representations 68 may include respective common sets of characteristics, such as codec, profile and level, resolution, number of views, file format for segments, text type information that may identify a language or other characteristics of text to be displayed with the representation and/or audio data to be decoded and presented, e.g., by speakers, camera angle information that may describe a camera angle or real-world camera perspective of a scene for representations in the adaptation set, rating information that describes content suitability for particular audiences, or the like.

Manifest file 66 may include data indicative of the subsets of representations 68 corresponding to particular adaptation sets, as well as common characteristics for the adaptation sets. Manifest file 66 may also include data representative of individual characteristics, such as bitrates, for individual representations of adaptation sets. In this manner, an adaptation set may provide for simplified network bandwidth adaptation. Representations in an adaptation set may be indicated using child elements of an adaptation set element of manifest file 66.

Server device 60 includes request processing unit 70 and network interface 72. In some examples, server device 60 may include a plurality of network interfaces. Furthermore, any or all of the features of server device 60 may be implemented on other devices of a content delivery network, such as routers, bridges, proxy devices, switches, or other devices. In some examples, intermediate devices of a content delivery network may cache data of multimedia content 64, and include components that conform substantially to those of server device 60. In general, network interface 72 is configured to send and receive data via network 74.

Request processing unit 70 is configured to receive network requests from client devices, such as client device 40, for data of storage medium 62. For example, request processing unit 70 may implement hypertext transfer protocol (HTTP) version 1.1, as described in RFC 2616, "Hypertext Transfer Protocol—HTTP/1.1," by R. Fielding et al, Network Working Group, IETF, June 1999. That is, request processing unit 70 may be configured to receive HTTP GET or partial GET requests and provide data of multimedia content 64 in response to the requests. The requests may specify a segment of one of representations 68, e.g., using a URL of the segment. In some examples, the requests may also specify one or more byte ranges of the segment, thus comprising partial GET requests. Request processing unit 70 may further be configured to service HTTP HEAD requests to provide header data of a segment of one of representations 68. In any case, request processing unit 70 may be configured to process the requests to provide requested data to a requesting device, such as client device 40.

Additionally or alternatively, request processing unit 70 may be configured to deliver media data via a broadcast or multicast protocol, such as eMBMS. Content preparation device 20 may create DASH segments and/or sub-segments in substantially the same way as described, but server device 60 may deliver these segments or sub-segments using eMBMS or another broadcast or multicast network transport protocol. For example, request processing unit 70 may be configured to receive a multicast group join request from client device 40. That is, server device 60 may advertise an Internet protocol (IP) address associated with a multicast group to client devices, including client device 40, associated with particular media content (e.g., a broadcast of a live event). Client device 40, in turn, may submit a request to join the multicast group. This request may be propagated throughout network 74, e.g., routers making up network 74, such that the routers are caused to direct traffic destined for the IP address associated with the multicast group to subscribing client devices, such as client device 40.

As illustrated in the example of FIG. 1, multimedia content 64 includes manifest file 66, which may correspond to a media presentation description (MPD). Manifest file 66 may contain descriptions of different alternative representations 68 (e.g., video services with different qualities) and the description may include, e.g., codec information, a profile value, a level value, a bitrate, and other descriptive characteristics of representations 68. Client device 40 may retrieve the MPD of a media presentation to determine how to access segments of representations 68.

In particular, retrieval unit 52 may retrieve configuration data (not shown) of client device 40 to determine decoding capabilities of video decoder 48 and rendering capabilities of video output 44. The configuration data may also include any or all of a language preference selected by a user of client device 40, one or more camera perspectives corresponding to depth preferences set by the user of client device 40, and/or a rating preference selected by the user of client device 40. Retrieval unit 52 may comprise, for example, a web browser or a media client configured to submit HTTP GET and partial GET requests. Retrieval unit 52 may correspond to software instructions executed by one or more processors or processing units (not shown) of client device 40. In some examples, all or portions of the functionality described with respect to retrieval unit 52 may be implemented in hardware, or a combination of hardware, software, and/or firmware, where requisite hardware may be provided to execute instructions for software or firmware.

Retrieval unit 52 may compare the decoding and rendering capabilities of client device 40 to characteristics of representations 68 indicated by information of manifest file 66. Retrieval unit 52 may initially retrieve at least a portion of manifest file 66 to determine characteristics of representations 68. For example, retrieval unit 52 may request a portion of manifest file 66 that describes characteristics of one or more adaptation sets. Retrieval unit 52 may select a subset of representations 68 (e.g., an adaptation set) having characteristics that can be satisfied by the coding and rendering capabilities of client device 40. Retrieval unit 52 may then determine bitrates for representations in the adaptation set, determine a currently available amount of network bandwidth, and retrieve segments from one of the representations having a bitrate that can be satisfied by the network bandwidth.

In general, higher bitrate representations may yield higher quality video playback, while lower bitrate representations may provide sufficient quality video playback when available network bandwidth decreases. Accordingly, when available network bandwidth is relatively high, retrieval unit 52 may retrieve data from relatively high bitrate representations, whereas when available network bandwidth is low, retrieval unit 52 may retrieve data from relatively low bitrate representations. In this manner, client device 40 may stream multimedia data over network 74 while also adapting to changing network bandwidth availability of network 74.

Additionally or alternatively, retrieval unit 52 may be configured to receive data in accordance with a broadcast or multicast network protocol, such as eMBMS or IP multicast. In such examples, retrieval unit 52 may submit a request to join a multicast network group associated with particular media content. After joining the multicast group, retrieval unit 52 may receive data of the multicast group without further requests issued to server device 60 or content preparation device 20. Retrieval unit 52 may submit a request to leave the multicast group when data of the multicast group is no longer needed, e.g., to stop playback or to change channels to a different multicast group.

Network interface 54 may receive and provide data of segments of a selected representation to retrieval unit 52, which may in turn provide the segments to decapsulation unit 50. Decapsulation unit 50 may decapsulate elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

Video encoder 28, video decoder 48, audio encoder 26, audio decoder 46, encapsulation unit 30, retrieval unit 52, and decapsulation unit 50 each may be implemented as any of a variety of suitable processing circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 28 and video decoder 48 may be included in one or more encoders or decoders, either of which may be integrated as part of a combined video encoder/decoder (CODEC). Likewise, each of audio encoder 26 and audio decoder 46 may be included in one or more encoders or decoders, either of which may be integrated as part of a combined CODEC. An apparatus including video encoder 28, video decoder 48, audio encoder 26, audio decoder 46, encapsulation unit 30, retrieval unit 52, and/or decapsulation unit 50 may comprise an integrated circuit, a microprocessor, and/or a wireless communication device, such as a cellular telephone.

Client device 40, server device 60, and/or content preparation device 20 may be configured to operate in accordance with the techniques of this disclosure. For purposes of example, this disclosure describes these techniques with respect to client device 40 and server device 60. However, it should be understood that content preparation device 20 may be configured to perform these techniques, instead of (or in addition to) server device 60.

Encapsulation unit 30 may form NAL units comprising a header that identifies a program to which the NAL unit belongs, as well as a payload, e.g., audio data, video data, or data that describes the transport or program stream to which the NAL unit corresponds. For example, in H.264/AVC, a NAL unit includes a 1-byte header and a payload of varying size. A NAL unit including video data in its payload may comprise various granularity levels of video data. For example, a NAL unit may comprise a block of video data, a plurality of blocks, a slice of video data, or an entire picture of video data. Encapsulation unit 30 may receive encoded video data from video encoder 28 in the form of PES packets of elementary streams. Encapsulation unit 30 may associate each elementary stream with a corresponding program.

Encapsulation unit 30 may also assemble access units from a plurality of NAL units. In general, an access unit may comprise one or more NAL units for representing a frame of video data, as well audio data corresponding to the frame when such audio data is available. An access unit generally includes all NAL units for one output time instance, e.g., all audio and video data for one time instance. For example, if each view has a frame rate of 20 frames per second (fps), then each time instance may correspond to a time interval of 0.05 seconds. During this time interval, the specific frames for all views of the same access unit (the same time instance) may be rendered simultaneously. In one example, an access unit may comprise a coded picture in one time instance, which may be presented as a primary coded picture.

Accordingly, an access unit may comprise all audio and video frames of a common temporal instance, e.g., all views corresponding to time X. This disclosure also refers to an encoded picture of a particular view as a "view component." That is, a view component may comprise an encoded picture (or frame) for a particular view at a particular time. Accordingly, an access unit may be defined as comprising all view components of a common temporal instance. The decoding order of access units need not necessarily be the same as the output or display order.

A media presentation may include a media presentation description (MPD), which may contain descriptions of different alternative representations (e.g., video services with different qualities) and the description may include, e.g., codec information, a profile value, and a level value. An MPD is one example of a manifest file, such as manifest file 66. Client device 40 may retrieve the MPD of a media presentation to determine how to access movie fragments of various presentations. Movie fragments may be located in movie fragment boxes (moof boxes) of video files.

Manifest file 66 (which may comprise, for example, an MPD) may advertise availability of segments of representations 68. That is, the MPD may include information indicating the wall-clock time at which a first segment of one of representations 68 becomes available, as well as information indicating the durations of segments within representations 68. In this manner, retrieval unit 52 of client device 40 may determine when each segment is available, based on the starting time as well as the durations of the segments preceding a particular segment.

After encapsulation unit 30 has assembled NAL units and/or access units into a video file based on received data, encapsulation unit 30 passes the video file to output interface 32 for output. In some examples, encapsulation unit 30 may store the video file locally or send the video file to a remote server via output interface 32, rather than sending the video file directly to client device 40. Output interface 32 may comprise, for example, a transmitter, a transceiver, a device for writing data to a computer-readable medium such as, for example, an optical drive, a magnetic media drive (e.g., floppy drive), a universal serial bus (USB) port, a network interface, or other output interface. Output interface 32 outputs the video file to a computer-readable medium, such as, for example, a transmission signal, a magnetic medium, an optical medium, a memory, a flash drive, or other computer-readable medium.

Network interface 54 may receive a NAL unit or access unit via network 74 and provide the NAL unit or access unit to decapsulation unit 50, via retrieval unit 52. Decapsulation unit 50 may decapsulate a elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

In accordance with the techniques of this disclosure, encapsulation unit 30 may use a single type of signaling for a variety of purposes, e.g., any or all of a content preparation stage, delivery level, and/or a content consumption stage. Likewise, retrieval unit 52 may use this single type of signaling for any or all of these purposes.

In one example, the single type of signaling is a file type (ftyp) box that includes a value acting as an identifier for one or more CMAF tracks. Thus, encapsulation unit 30 may set a value for the ftyp box, and retrieval unit 52 may read a value for the ftyp box. Additionally, request processing unit 70 may also read the value for the ftyp box. These components may use the value of the ftyp box during any or all of content preparation, delivery, and/or content consumption.

Additionally or alternatively, the single type of signaling may be a segment type (styp) box that includes a value acting as an identifier for one or more CMAF tracks. The styp box may act as a delimiter to identify boundaries of CMAF fragments and/or chunks, identifiers for CMAF data structures, identifiers for DASH segments (or segments for other network streaming technologies), and/or as identifiers for processing requirements. Thus, encapsulation unit 30 may specify values for one or more styp boxes of a segment to represent any or all of boundaries of CMAF fragments and/or chunks of the segment, identifiers for CMAF data structures of the segment, an identifier for the DASH segment, and/or as identifiers for processing requirements for media data of the segment. In general, styp boxes are optional and may or may not be used, to avoid issues with backward-compatibility and overhead.

Table 1 below represents example "brands" of type values in accordance with the techniques of this disclosure, including locations of each brand type and example conformance requirements:

TABLE 1

| Brand | Location | Conformance Requirements |
|---|---|---|
| 'cmfc' | FileTypeBox and SegmentTypeBox | The Common Media Application Track Format |
| 'cmfs' | SegmentTypeBox | CMAF Segments |
| 'cmfl' | SegmentTypeBox | CMAF Chunks |
| 'cmff' | SegmentTypeBox | CMAF Fragment (identifies the presence the first samples of the CMAF Fragment) |

Tables 2-6 below represent additional example data structures that may be used in accordance with the techniques of this disclosure:

TABLE 2

CMAF Track File

| NL 0 | Format Req. | Specification | Requirements | Description |
|---|---|---|---|---|
| CMAF Header | 1 | CMAF | CMAF 7.2 | CMAF Header |
| sidx | 0/1 | | | Segment Index |
| CMAF Fragment | All of CMAF Track | CMAF | CMAF | CMAF Fragments |

TABLE 3

CMAF Header

| NL 0 | Format Req. | ISOBMFF | CMAF Constraints | Description |
|---|---|---|---|---|
| ftyp | 1 | [ISOBMFF] 4.3 | CMAF 7.2 | File Type and Compatibility cmfc |
| moov | 1 | [ISOBMFF] 8.2.1 | | Container for functional metadata |

TABLE 4

CMAF Segment

| NL 0 | Format Req. | Specification | Requirements | Description |
|---|---|---|---|---|
| styp | 0/1 | [ISOBMFF] 8.16.2 | | Segment Type Signalling compatibility to CMAF Segment cmfs |
| CMAF Fragment | 1+ | CMAF | 7.3.2.3 | CMAF Fragment |

TABLE 5

CMAF Fragment

| NL 0 | Format Req. | Specification | Requirements | Description |
|---|---|---|---|---|
| styp | 0/1 | [ISOBMFF] 8.16.2 | | Segment Type Signalling compatibility to CMAF Fragment cmff |
| CMAF Chunk | 1+ | CMAF | Just above | CMAF Chunk |

TABLE 6

CMAF Chunk

| NL 0 | Format Req. | Specification | Requirements | Description |
|---|---|---|---|---|
| styp | 0/1 | [ISOBMFF] 8.16.2 | | Segment Type Signaling compatibility to CMAF Chunk cmfl |
| prft | 0/1 | [ISOBMFF] 8.16.5 | | Producer Reference Time |
| emsg | * | [DASH] | CMAF 7.4.5 | Event Message |
| moof | 1 | [ISOBMFF] 8.8.4 | | Movie Fragment |
| mdat | 1 | [ISOBMFF] 8.2.2 | CMAF 7.5.18 | Media Data container for media samples |

With respect to delivery and consumption, in some examples, ftyp and styp provide indications of the compatibility of the type and how the type can be used. The box may be at the start of the object, and therefore, easy to find and parse (e.g., by retrieval unit 52 and/or decapsulation unit 50). Multiple compatibility types may be used to signal different types. The type of the box may also be exposed as an Internet Media type using the profiles parameter and, for example, be used in the HTTP case (e.g., for DASH streaming or other HTTP streaming technologies). This may enable different distribution modes.

With respect to use of types as delimiters, the type values may delimit chunks in fragments, delimit fragments in segments and track files, and/or delimit ranges to provide proper interpretation. The delimiter (e.g., type value) may also represent types, in order for a receiving element (e.g., retrieval unit 52 and/or decapsulation unit 50) to determine the type of data (e.g., media data) included in the chunk, fragment, segment, track file, or the like. No indices of subsequent fields are necessary, and hence, these techniques may support real-time processing.

Figure 2:
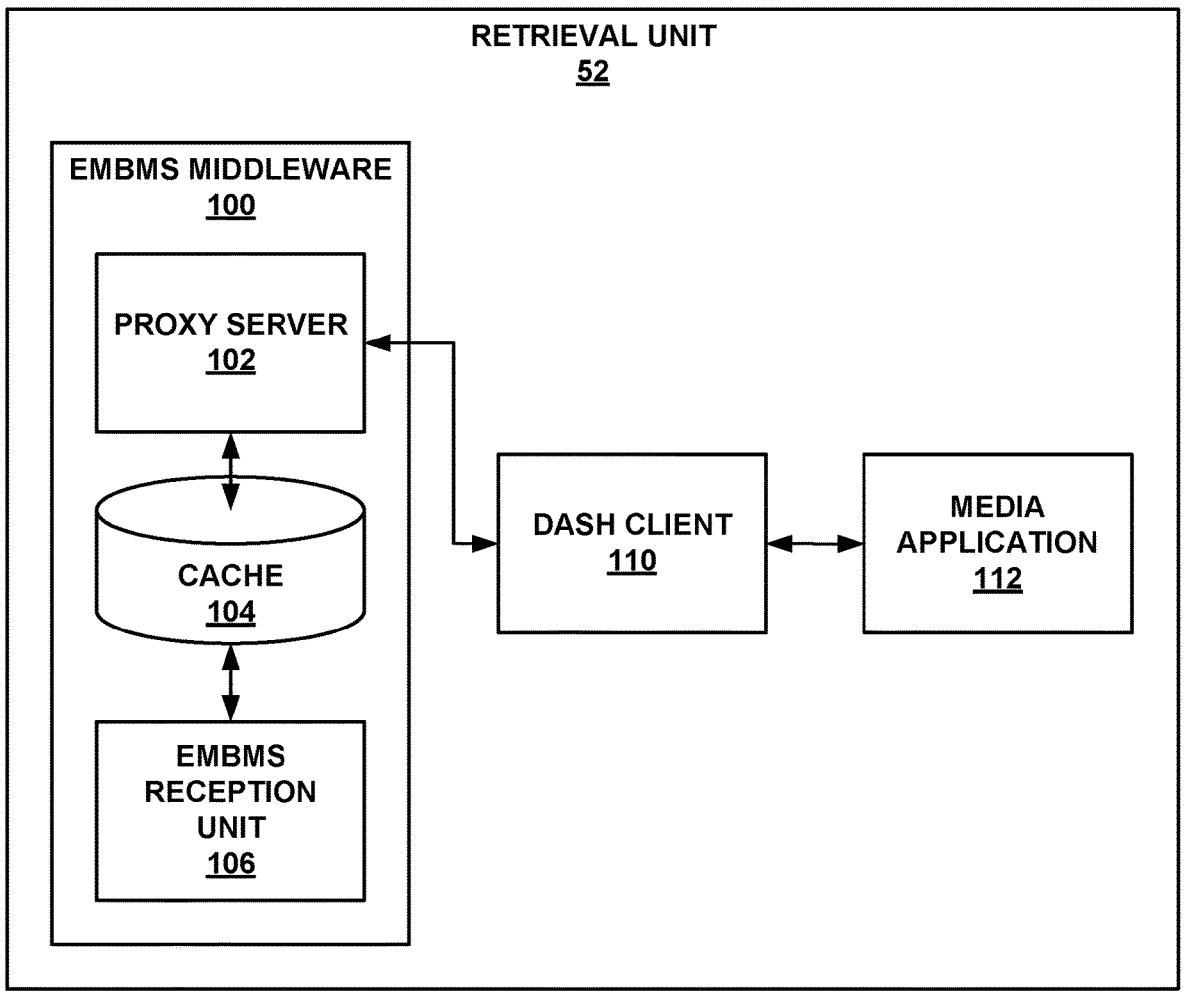
FIG. 2 is a block diagram illustrating an example set of components of the retrieval unit of FIG. 1 in greater detail.

FIG. 2 is a block diagram illustrating an example set of components of retrieval unit 52 of FIG. 1 in greater detail. In this example, retrieval unit 52 includes eMBMS middleware unit 100, DASH client 110, and media application 112.

In the example of FIG. 2, eMBMS middleware unit 100 further includes eMBMS reception unit 106, cache 104, and server unit 102. In this example, eMBMS reception unit 106 is configured to receive data via eMBMS, e.g., according to File Delivery over Unidirectional Transport (FLUTE), described in T. Paila et al., "FLUTE—File Delivery over Unidirectional Transport," Network Working Group, RFC 6726, November 2012, available at http://tools.ietf.org/html/rfc6726. That is, eMBMS reception unit 106 may receive files via broadcast from, e.g., server device 60, which may act as a BM-SC.

As eMBMS middleware unit 100 receives data for files, eMBMS middleware unit may store the received data in cache 104. Cache 104 may comprise a computer-readable storage medium, such as flash memory, a hard disk, RAM, or any other suitable storage medium.

Local server unit 102 may act as a server for DASH client 110. For example, local server unit 102 may provide a MPD file or other manifest file to DASH client 110. Local server unit 102 may advertise availability times for segments in the MPD file, as well as hyperlinks from which the segments can be retrieved. These hyperlinks may include a localhost address prefix corresponding to client device 40 (e.g., 127.0.0.1 for IPv4). In this manner, DASH client 110 may request segments from local server unit 102 using HTTP GET or partial GET requests. For example, for a segment available from link http://127.0.0.1/rep1/seg3, DASH client 110 may construct an HTTP GET request that includes a request for http://127.0.0.1/rep1/seg3, and submit the request to local server unit 102. Local server unit 102 may retrieve requested data from cache 104 and provide the data to DASH client 110 in response to such requests.

Figure 3:
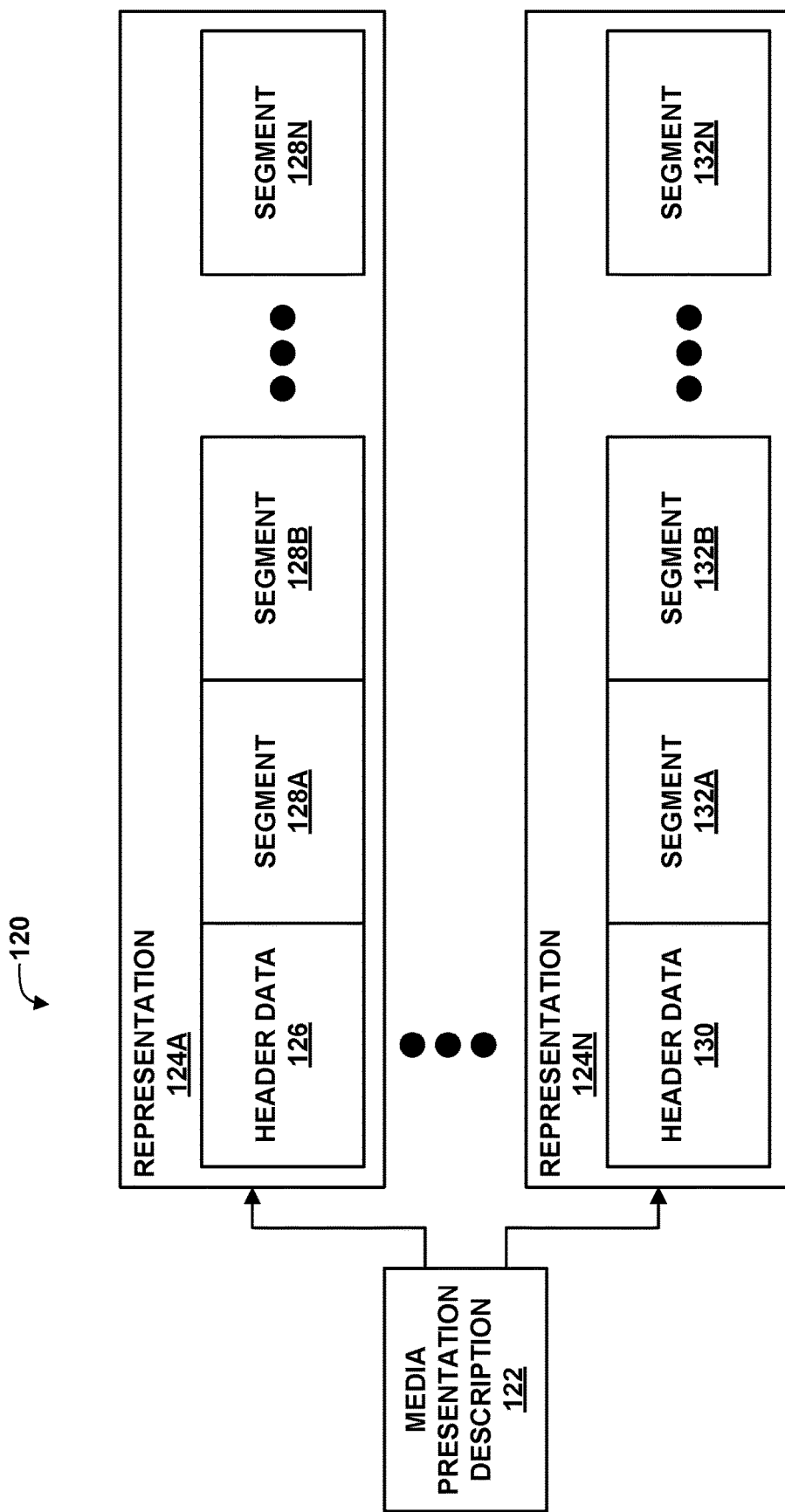
FIG. 3 is a conceptual diagram illustrating elements of example multimedia content.

FIG. 3 is a conceptual diagram illustrating elements of example multimedia content 120. Multimedia content 120 may correspond to multimedia content 64 (FIG. 1), or another multimedia content stored in storage medium 62. In the example of FIG. 3, multimedia content 120 includes media presentation description (MPD) 122 and a plurality of representations 124A-124N (representations 124). Representation 124A includes optional header data 126 and segments 128A-128N (segments 128), while representation 124N includes optional header data 130 and segments 132A-132N (segments 132). The letter N is used to designate the last movie fragment in each of representations 124 as a matter of convenience. In some examples, there may be different numbers of movie fragments between representations 124.

MPD 122 may comprise a data structure separate from representations 124. MPD 122 may correspond to manifest file 66 of FIG. 1. Likewise, representations 124 may correspond to representations 68 of FIG. 2. In general, MPD 122 may include data that generally describes characteristics of representations 124, such as coding and rendering characteristics, adaptation sets, a profile to which MPD 122 corresponds, text type information, camera angle information, rating information, trick mode information (e.g., information indicative of representations that include temporal sub-sequences), and/or information for retrieving remote periods (e.g., for targeted advertisement insertion into media content during playback).

Header data 126, when present, may describe characteristics of segments 128, e.g., temporal locations of random access points (RAPs, also referred to as stream access points (SAPs)), which of segments 128 includes random access points, byte offsets to random access points within segments 128, uniform resource locators (URLs) of segments 128, or other aspects of segments 128. Header data 130, when present, may describe similar characteristics for segments 132. Additionally or alternatively, such characteristics may be fully included within MPD 122.

Segments 128, 132 include one or more coded video samples, each of which may include frames or slices of video data. Each of the coded video samples of segments 128 may have similar characteristics, e.g., height, width, and bandwidth requirements. Such characteristics may be described by data of MPD 122, though such data is not illustrated in the example of FIG. 3. MPD 122 may include characteristics as described by the 3GPP Specification, with the addition of any or all of the signaled information described in this disclosure.

Each of segments 128, 132 may be associated with a unique uniform resource locator (URL). Thus, each of segments 128, 132 may be independently retrievable using a streaming network protocol, such as DASH. In this manner, a destination device, such as client device 40, may use an HTTP GET request to retrieve segments 128 or 132. In some examples, client device 40 may use HTTP partial GET requests to retrieve specific byte ranges of segments 128 or 132.

Figure 4:
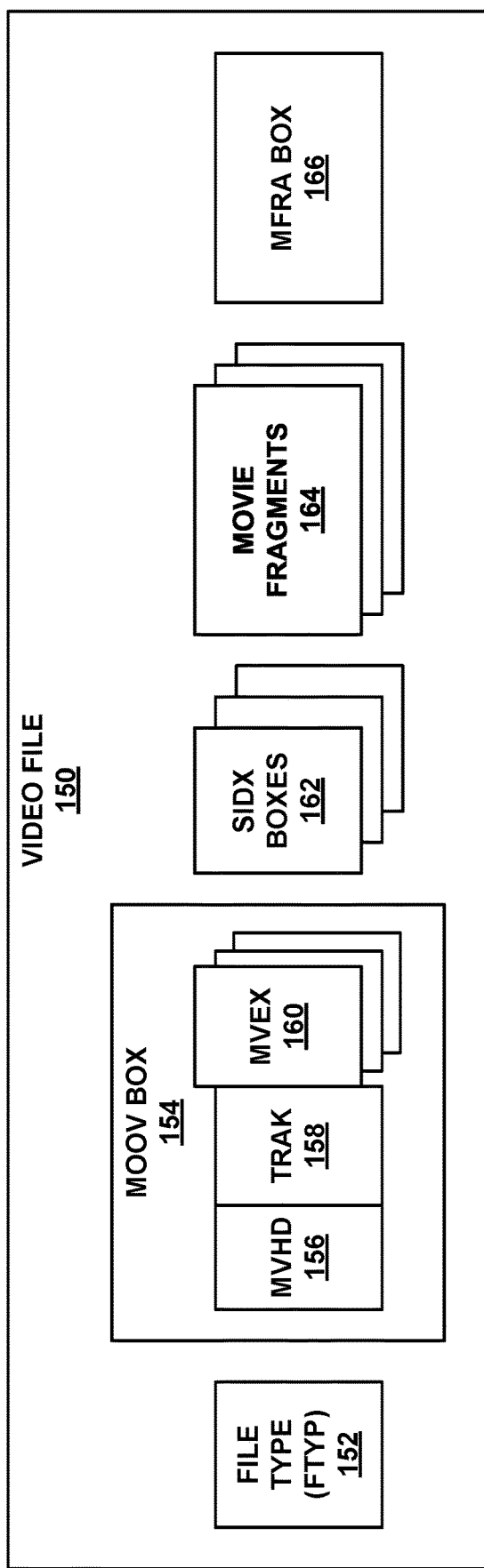
FIG. 4 is a block diagram illustrating elements of an example video file, which may correspond to a segment of a representation.

FIG. 4 is a block diagram illustrating elements of an example video file 150, which may correspond to a segment of a representation, such as one of segments 114, 124 of FIG.

3. Each of segments 128, 132 may include data that conforms substantially to the arrangement of data illustrated in the example of FIG. 4. Video file 150 may be said to encapsulate a segment. As described above, video files in accordance with the ISO base media file format and extensions thereof store data in a series of objects, referred to as "boxes." In the example of FIG. 4, video file 150 includes file type (FTYP) box 152, movie (MOOV) box 154, segment index (sidx) boxes 162, movie fragment (MOOF) boxes 164, and movie fragment random access (MFRA) box 166. Although FIG. 4 represents an example of a video file, it should be understood that other media files may include other types of media data (e.g., audio data, timed text data, or the like) that is structured similarly to the data of video file 150, in accordance with the ISO base media file format and its extensions.

File type (FTYP) box 152 generally describes a file type for video file 150. File type box 152 may include data that identifies a specification that describes a best use for video file 150. File type box 152 may alternatively be placed before MOOV box 154, movie fragment boxes 164, and/or MFRA box 166.

Figure 7:
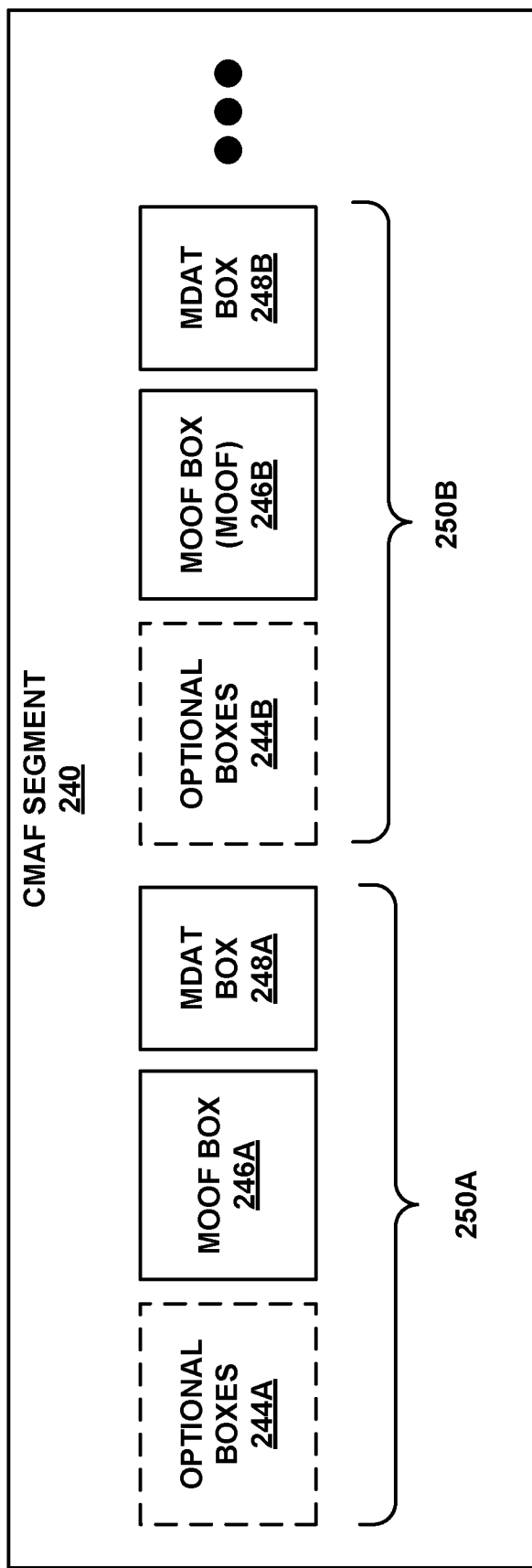
FIG. 7 is a conceptual diagram illustrating an example CMAF segment.

In some examples, a Segment, such as video file 150, may include an MPD update box (not shown) before FTYP box 152. The MPD update box may include information indicating that an MPD corresponding to a representation including video file 150 is to be updated, along with information for updating the MPD. For example, the MPD update box may provide a URI or URL for a resource to be used to update the MPD. As another example, the MPD update box may include data for updating the MPD. In some examples, the MPD update box may immediately follow a segment type (STYP) box (not shown) of video file 150, where the STYP box may define a segment type for video file 150. FIG. 7, discussed in greater detail below, provides additional information with respect to the MPD update box.

MOOV box 154, in the example of FIG. 4, includes movie header (MVHD) box 156, track (TRAK) box 158, and one or more movie extends (MVEX) boxes 160. In general, MVHD box 156 may describe general characteristics of video file 150. For example, MVHD box 156 may include data that describes when video file 150 was originally created, when video file 150 was last modified, a timescale for video file 150, a duration of playback for video file 150, or other data that generally describes video file 150.

TRAK box 158 may include data for a track of video file 150. TRAK box 158 may include a track header (TKHD) box that describes characteristics of the track corresponding to TRAK box 158. In some examples, TRAK box 158 may include coded video pictures, while in other examples, the coded video pictures of the track may be included in movie fragments 164, which may be referenced by data of TRAK box 158 and/or sidx boxes 162.

In some examples, video file 150 may include more than one track. Accordingly, MOOV box 154 may include a number of TRAK boxes equal to the number of tracks in video file 150. TRAK box 158 may describe characteristics of a corresponding track of video file 150. For example, TRAK box 158 may describe temporal and/or spatial information for the corresponding track. A TRAK box similar to TRAK box 158 of MOOV box 154 may describe characteristics of a parameter set track, when encapsulation unit 30 (FIG. 3) includes a parameter set track in a video file, such as video file 150. Encapsulation unit 30 may signal the presence of sequence level SEI messages in the parameter set track within the TRAK box describing the parameter set track.

MVEX boxes 160 may describe characteristics of corresponding movie fragments 164, e.g., to signal that video file 150 includes movie fragments 164, in addition to video data included within MOOV box 154, if any. In the context of streaming video data, coded video pictures may be included in movie fragments 164 rather than in MOOV box 154. Accordingly, all coded video samples may be included in movie fragments 164, rather than in MOOV box 154.

MOOV box 154 may include a number of MVEX boxes 160 equal to the number of movie fragments 164 in video file 150. Each of MVEX boxes 160 may describe characteristics of a corresponding one of movie fragments 164. For example, each MVEX box may include a movie extends header box (MEHD) box that describes a temporal duration for the corresponding one of movie fragments 164.

As noted above, encapsulation unit 30 may store a sequence data set in a video sample that does not include actual coded video data. A video sample may generally correspond to an access unit, which is a representation of a coded picture at a specific time instance. In the context of AVC, the coded picture include one or more VCL NAL units which contains the information to construct all the pixels of the access unit and other associated non-VCL NAL units, such as SEI messages. Accordingly, encapsulation unit 30 may include a sequence data set, which may include sequence level SEI messages, in one of movie fragments 164. Encapsulation unit 30 may further signal the presence of a sequence data set and/or sequence level SEI messages as being present in one of movie fragments 164 within the one of MVEX boxes 160 corresponding to the one of movie fragments 164.

SIDX boxes 162 are optional elements of video file 150. That is, video files conforming to the 3GPP file format, or other such file formats, do not necessarily include SIDX boxes 162. In accordance with the example of the 3GPP file format, a SIDX box may be used to identify a sub-segment of a segment (e.g., a segment contained within video file 150). The 3GPP file format defines a sub-segment as "a self-contained set of one or more consecutive movie fragment boxes with corresponding Media Data box(es) and a Media Data Box containing data referenced by a Movie Fragment Box must follow that Movie Fragment box and precede the next Movie Fragment box containing information about the same track." The 3GPP file format also indicates that a SIDX box "contains a sequence of references to subsegments of the (sub)segment documented by the box. The referenced subsegments are contiguous in presentation time. Similarly, the bytes referred to by a Segment Index box are always contiguous within the segment. The referenced size gives the count of the number of bytes in the material referenced."

SIDX boxes 162 generally provide information representative of one or more sub-segments of a segment included in video file 150. For instance, such information may include playback times at which sub-segments begin and/or end, byte offsets for the sub-segments, whether the sub-segments include (e.g., start with) a stream access point (SAP), a type for the SAP (e.g., whether the SAP is an instantaneous decoder refresh (IDR) picture, a clean random access (CRA) picture, a broken link access (BLA) picture, or the like), a position of the SAP (in terms of playback time and/or byte offset) in the sub-segment, and the like.

Movie fragments 164 may include one or more coded video pictures. In some examples, movie fragments 164 may include one or more groups of pictures (GOPs), each of which may include a number of coded video pictures, e.g., frames or pictures. In addition, as described above, movie fragments 164 may include sequence data sets in some examples. Each of movie fragments 164 may include a movie fragment header box (MFHD, not shown in FIG. 4). The MFHD box may describe characteristics of the corresponding movie fragment, such as a sequence number for the movie fragment. Movie fragments 164 may be included in order of sequence number in video file 150. In some examples, one or more of movie fragments 164 may be preceded by a CMAF header, e.g., in accordance with Table 3 as discussed above. Moreover, a CMAF segment may include one or more CMAF fragments, each of which may include one or more optional boxes, a movie fragment box, and a media data box.

MFRA box 166 may describe random access points within movie fragments 164 of video file 150. This may assist with performing trick modes, such as performing seeks to particular temporal locations (i.e., playback times) within a segment encapsulated by video file 150. MFRA box 166 is generally optional and need not be included in video files, in some examples. Likewise, a client device, such as client device 40, does not necessarily need to reference MFRA box 166 to correctly decode and display video data of video file 150. MFRA box 166 may include a number of track fragment random access (TFRA) boxes (not shown) equal to the number of tracks of video file 150, or in some examples, equal to the number of media tracks (e.g., non-hint tracks) of video file 150.

In some examples, movie fragments 164 may include one or more stream access points (SAPs), such as IDR pictures. Likewise, MFRA box 166 may provide indications of locations within video file 150 of the SAPs. Accordingly, a temporal sub-sequence of video file 150 may be formed from SAPs of video file 150. The temporal sub-sequence may also include other pictures, such as P-frames and/or B-frames that depend from SAPs. Frames and/or slices of the temporal sub-sequence may be arranged within the segments such that frames/slices of the temporal sub-sequence that depend on other frames/slices of the sub-sequence can be properly decoded. For example, in the hierarchical arrangement of data, data used for prediction for other data may also be included in the temporal sub-sequence.

Figure 5:
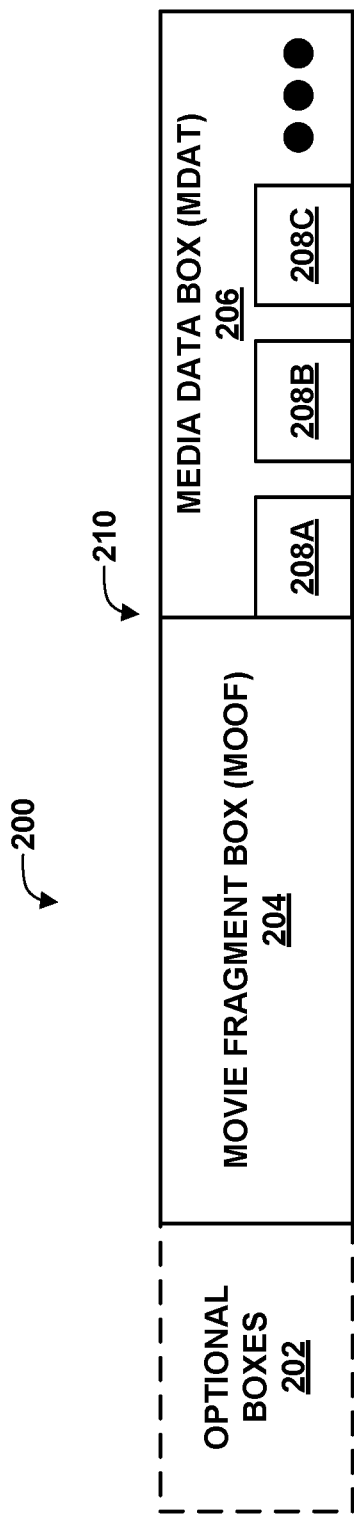
FIG. 5 is a conceptual diagram illustrating an example Common Media Application Format (CMAF) fragment.

FIG. 5 is a conceptual diagram illustrating an example CMAF fragment 200. CMAF fragment 200 of FIG. 5 may correspond to one of movie fragments 164 of FIG. 4. CMAF fragment 200 may conform to Table 5 above. CMAF fragments, such as CMAF fragment 200, may be the smallest switching units that are handled by CMAF encoding, CMAF delivery, and CMAF players.

In the example of FIG. 5, CMAF fragment 200 includes zero or more optional boxes 202, a movie fragment (moof) box 204, and a media data (mdat) box 206. Optional boxes 202 are outlined with a dashed line to indicate that optional boxes 202 are optional. Optional boxes 202 of FIG. 5 may include none, any, or all of a segment type box, a producer reference time box, and/or DASH event message box(es).

MDAT box 206 includes random access media samples 208A-208C (random access media samples 208), which may correspond to one or more coded video streams (CVSs). A decode time 210 of a first sample, e.g., an ordinal first sample, of MDAT box 206 (e.g., random access media sample 208A) may be indicated by a track fragment decode time (tfdt) box, which may be included in moof box 204. In particular, the tfdt box may be included in a track fragment (traf) box of moof box 204, and may indicate a track fragment base media decode time.

In some examples, CMAF fragments, such as CMAF fragment 200, conform to the following constraints:
1. Each CMAF Fragment, in combination with its associated CMAF Header, shall contain sufficient metadata to be decoded, decrypted, and displayed when it is independently accessed. In addition to specified CMAF Track and Media Profile constraints, a CMAF Track is non-conformant if a CMAF Fragment cannot be decoded when processed with its associated CMAF Header. For instance, if sample groups and sample group descriptions are used to signal encryption key changes, then a SampleGroupDescriptionBox and SampleToGroupBox needs to be present in the TrackFragmentBox to make the CMAF Fragment randomly accessible and decryptable.
2. The CMAF Fragment MovieFragmentBox may be preceded by other boxes, including one or more SegmentTypeBox, ProducerReferenceTimeBox and/or DASHEventMessageBox(es). (See 7.4.5 and Annex E. of ISO/IEC 23000-19 for more information on Event Messages).
3. Each CMAF Fragment in a CMAF Track should have a duration of at least one second, with the possible exception of the first and last Fragments of the Track.

Figure 6:
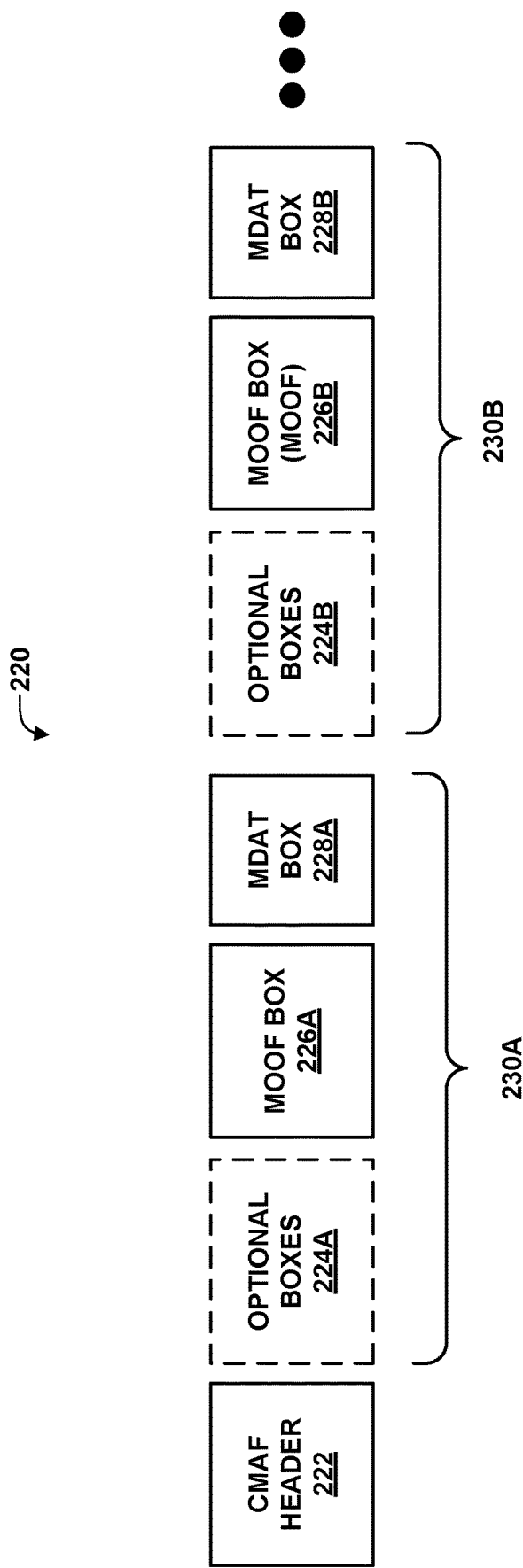
FIG. 6 is a conceptual diagram illustrating an example CMAF track.

FIG. 6 is a conceptual diagram illustrating an example CMAF track 220. In this example, CMAF track 220 includes CMAF header 222 and CMAF fragments 230A, 230B (CMAF fragments 230). Each of CMAF fragments 230 includes a respective set of zero or more optional boxes, a moof box, and an mdat box. For example, CMAF fragment 230A includes optional boxes 224A, moof box 226A, and mdat box 228A, while CMAF fragment 230B includes optional boxes 224B, moof box 226B, and mdat box 228B. In this manner, each of CMAF fragments 230 may generally include elements similar to the elements of CMAF fragment 200 of FIG. 5. CMAF track 220 of FIG. 6 may be included within a video file, such as video file 150 of FIG. 4, where CMAF header 222 may correspond to ftyp box 152 and moov box 154 of FIG. 4, and CMAF fragments 230 may begin at the beginning of movie fragments 164 of FIG. 4. CMAF track 200 may generally conform to Table 2 above.

According to the techniques of this disclosure, CMAF header 222 may include an ftyp value at NL 0, as discussed above, and as shown in the example of Table 3. That is, content preparation device 20 of FIG. 1 may set the ftyp value, at least in part, to indicate the start of CMAF header 222. Likewise, client device 40 of FIG. 1 (e.g., retrieval unit 52 of FIG. 1) may determine the location of CMAF header 222 by parsing a bitstream including CMAF track 220 and detecting the ftyp value. In response, retrieval unit 52 may determine that CMAF fragments 230 follow CMAF header 222 (e.g., ftyp box 152 and moov box 154 of FIG. 4), potentially also after one or more intervening sidx boxes, such as sidx boxes 162 (FIG. 4).

Moreover, each of CMAF fragments 230 may include styp values representative of whether the CMAF fragments 230 correspond to CMAF fragments only, CMAF segments, or CMAF chunks, e.g., in corresponding moof boxes 226A, 226B (moof boxes 226). Thus, retrieval unit 52 may determine whether one of CMAF fragments 230 is a CMAF fragment only, a CMAF chunk, or a CMAF segment, according to the values for the styp of the respective CMAF fragments in the respective moof boxes 226.

For example, content preparation device 20 (FIG. 1) may assign a value of "cmff" to the styp element of one of moof boxes 226 of a corresponding one of CMAF fragments 230 to indicate that the one of CMAF fragments 230 includes a CMAF chunk, a value of "cmff" to indicate that the one of CMAF fragments 230 is a CMAF fragment only, or a value of "cmfs" to indicate that the one of CMAF fragments 230 is included in a CMAF segment. Likewise, retrieval unit 52 may determine that one of CMAF fragments 230 includes a CMAF chunk when an styp element of the one of moof boxes 226 has a value of "cmfl," that the CMAF fragment is only a CMAF fragment when the styp element of the one of moof boxes 226 has a value of "cmff," or that the CMAF fragment is included in a CMAF segment when the styp element of the one of moof boxes 226 has a value of "cmfs."

FIG. 7 is a conceptual diagram illustrating an example CMAF segment 240. CMAF segment 240 of FIG. 7 may be included within a CMAF track file, following a CMAF header, e.g., as shown in FIG. 6. CMAF segment 240 may conform to Table 4 above.

In the example of FIG. 7, CMAF segment 240 includes two example CMAF fragments 250A, 250B (CMAF fragments 250). Each of CMAF fragments 250 includes a respective set of zero or more optional boxes, a moof box, and an mdat box. For example, CMAF fragment 250A includes optional boxes 244A, moof box 246A, and mdat box 248A, while CMAF fragment 250B includes optional boxes 244B, moof box 246B, and mdat box 248B. In this manner, each of CMAF fragments 250 may generally include elements similar to the elements of CMAF fragment 200 of FIG. 5. CMAF segment 240 of FIG. 7 may be included within a video file, such as video file 150 of FIG. 4, where CMAF fragments 250 may begin at the beginning of movie fragments 164 of FIG. 4.

In accordance with the techniques of this disclosure, content preparation device 20 (FIG. 1) may assign a value of "cmfs" to an styp value of moof box 246A of CMAF fragment 250A to indicate that CMAF fragment 250A is included within and represents the start of CMAF segment 240. Likewise, retrieval unit 52 of FIG. 1 may determine that CMAF fragment 250A represents the start of CMAF segment 240 in response to determining that an styp value of moof box 246A of CMAF fragment 250A has a value of "cmfs."

Figure 8:
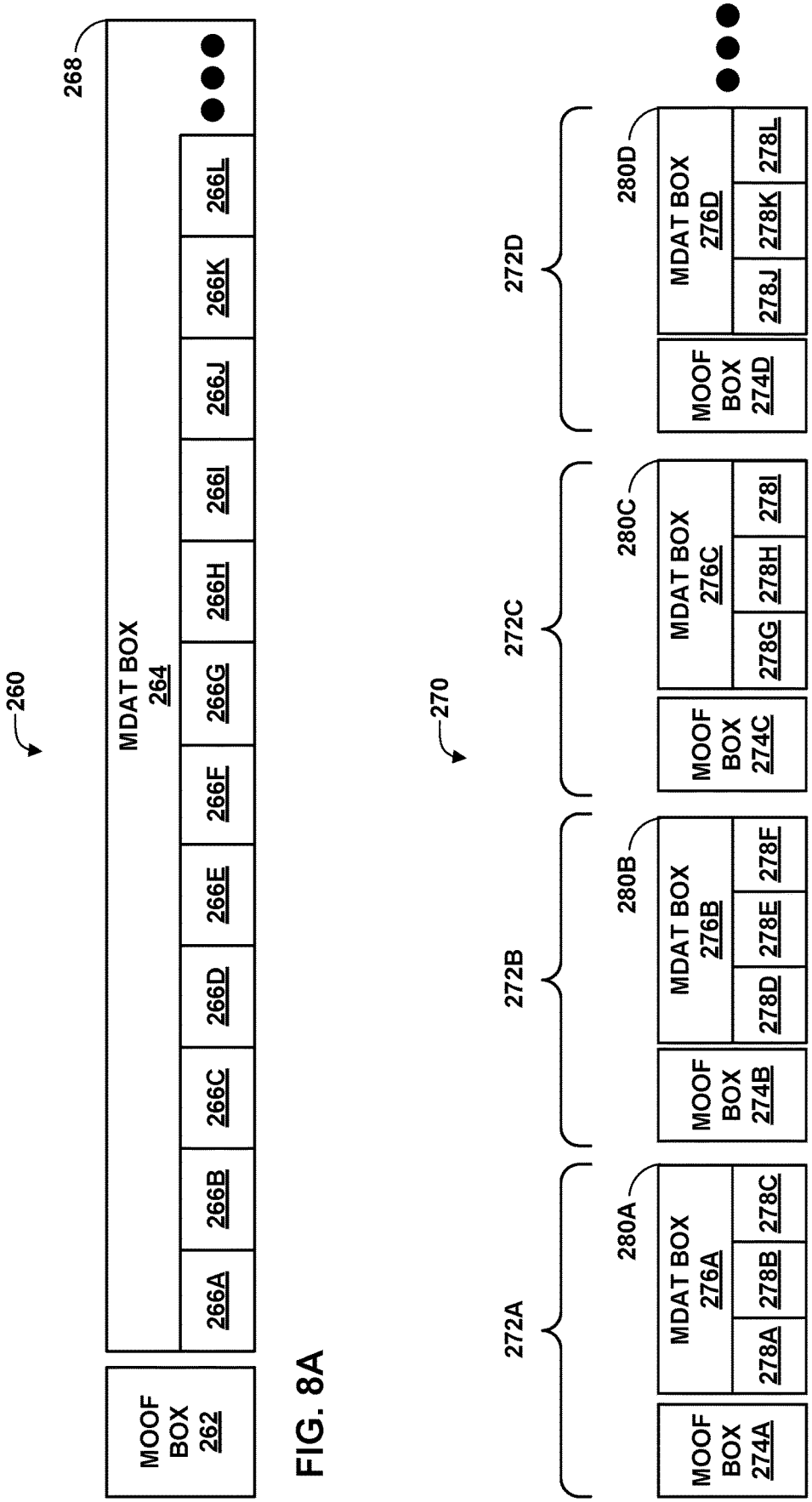
FIGS. 8A and 8B are conceptual diagrams illustrating example CMAF chunks.

FIGS. 8A and 8B are conceptual diagrams illustrating example CMAF fragments and CMAF chunks. In particular, FIG. 8A illustrates an example of a CMAF fragment 260 only. That is, CMAF fragment 260 includes moof box 262, mdat box 264, and coded video sequence samples 266A-266L (coded video sequence samples 266). FIG. 8B illustrates an example of a CMAF fragment 270 including CMAF chunks 272A-272D (CMAF chunks 272). Each of CMAF chunks 272 may conform to Table 6 above. That is, in this example, each of CMAF chunks 272 includes a respective moof box 274A-274D (moof boxes 274), mdat boxes 276A-276D (mdat boxes 276), and respective coded video sequence samples 278A-278L (coded video sequence samples 276).

CMAF chunks 272, as shown, may be included within CMAF fragment 270, which may be included within CMAF tracks and/or CMAF segments, as discussed above. In one example, CMAF chunks are the smallest atomic units that are handled by CMAF encoding, CMAF delivery, and CMAF Players. By dividing CMAF fragment 270 into CMAF chunks 272, e.g., as shown in FIG. 8B, media data of coded video sequence samples 278 can be output more frequently than media data of coded video sequence samples 266 of FIG. 8A. That is, content preparation device 20 of FIG. 1, for example, may output each of CMAF chunks 272 at respective encoder output times 280A-280D (encoder output times 280). By contrast, content preparation device 20 may output the entire CMAF fragment 260 at encoder output time 268. In this manner, using CMAF chunks, such as CMAF chunks 272, may reduce latency of transporting media data for a streaming service.

CMAF chunks 272 may be labeled as having styp values of "cmff" in respective moof boxes 274, per the techniques of this disclosure. That is, content preparation device 20 may specify the value of "cmff" in the respective moof boxes 274. Likewise, retrieval unit 52 may determine that CMAF fragment 270 includes CMAF chunks 272 based on the value of "cmff" in the respective moof boxes 274. Retrieval unit 52 may also determine the start of each of CMAF chunks 272 by parsing CMAF fragment 270 and detecting the value of "cmff" for styp values of the respective moof boxes 274.

In some examples, CMAF chunks may conform to the following constraints:
1. A CMAF Fragment shall include one or more ISO Base Media segments [ISOBMFF, 8.16] that each contains one MovieFragmentBox, followed by one or more MediaDataBox(es) containing the samples it references.
2. A CMAF fragment shall contain a MovieFragmentHeaderBox constrained as specified in 7.5.14 of ISO/IEC 23000-19.
3. Each TrackFragmentBox shall contain one TrackFragmentBaseMediaDecodeTimeBox.
4. All media samples in a CMAF Fragment shall be addressed by byte offsets in the TrackRunBox that are relative to the first byte of the MovieFragmentBox (see [ISOBMFF] 8.8.4).
5. The CMAF Chunk MovieFragmentBox may be preceded by other boxes, including a SegmentTypeBox, one or more ProducerReferenceTimeBox and/or DASHEventMessageBox(es). (See 7.4.5 and Annex E. for more information on Event Messages).

Figure 9:
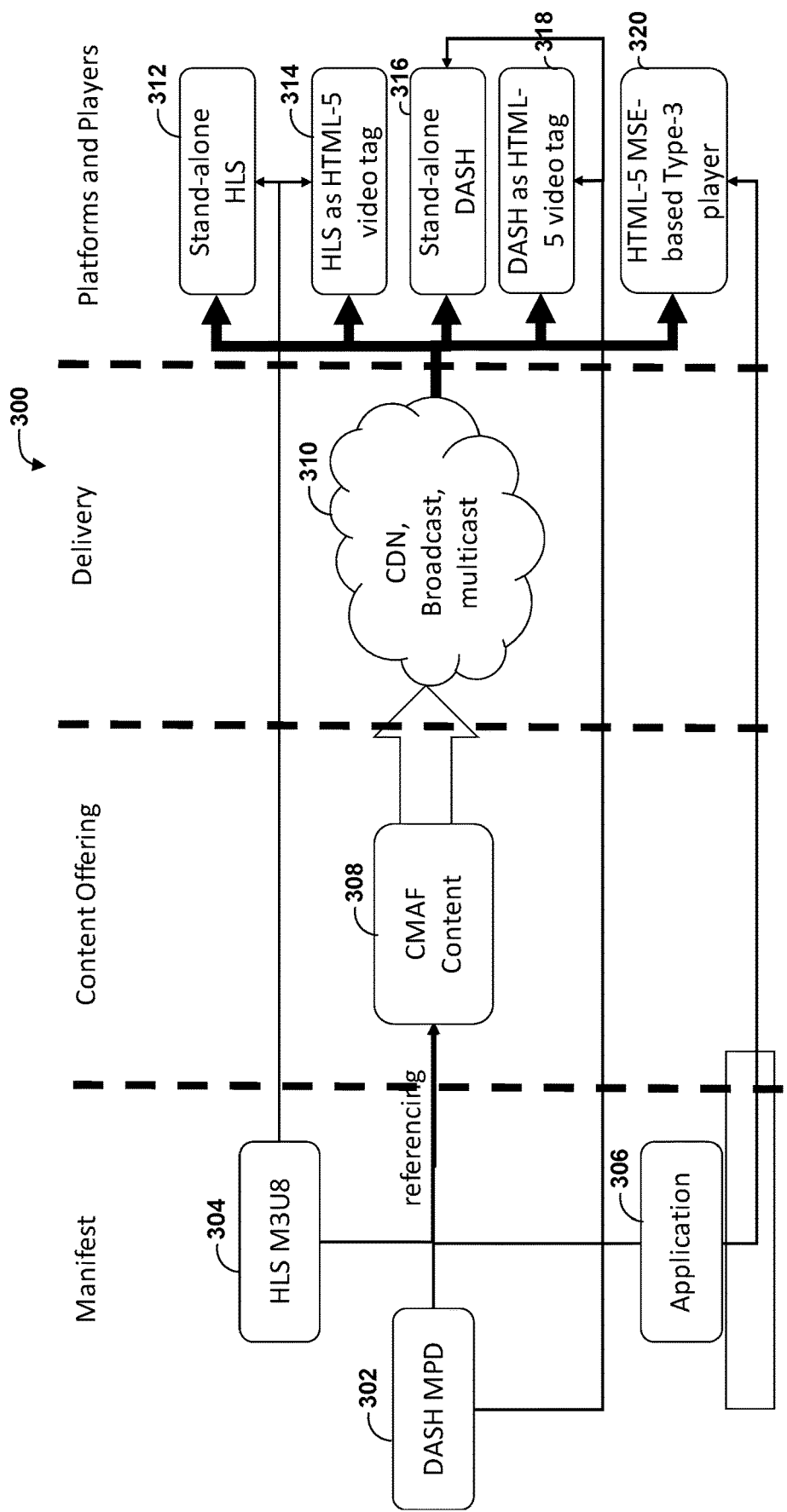
FIG. 9 is a conceptual diagram illustrating an example system in accordance with the techniques of this disclosure.

FIG. 9 is a conceptual diagram illustrating an example system 300 in accordance with the techniques of this disclosure. In this example, system 300 is divided into four logical portions: a manifest portion, a content offering portion, a delivery portion, and a platforms and players portion. The manifest portion and the content offering portion may generally correspond to content preparation device 20 of FIG. 1, the delivery portion may correspond to server device 60 of FIG. 1, and the platforms and players portion may correspond to client device 40 of FIG. 1.

In the example of FIG. 9, the manifest portion of system 300 includes DASH MPD 302, HTTP live streaming (HLS) M3U8 playlist 304, and an application 306. DASH MPD 302 references CMAF content 308, which is included in the content offering portion of system 300. CMAF content 308 is provided to a content delivery network (CDN) 310, which provides broadcast and/or multicast services as part of the delivery portion of system 300. Various platforms and players of the platforms and players portion of system 300 may receive media data from CDN 310, such as a standalone HTTP live streaming (HLS) player 312, a device 314 for receiving HLS as an HTML-5 video tag, a stand-alone DASH player 316, a device 318 for receiving DASH as an HTML-5 video tag, and/or an HTML-5 MSE-based Type-3 player 320. The techniques of this disclosure may generally support one type of signaling for devices configured according to any or all of these example use cases.

Figure 10:
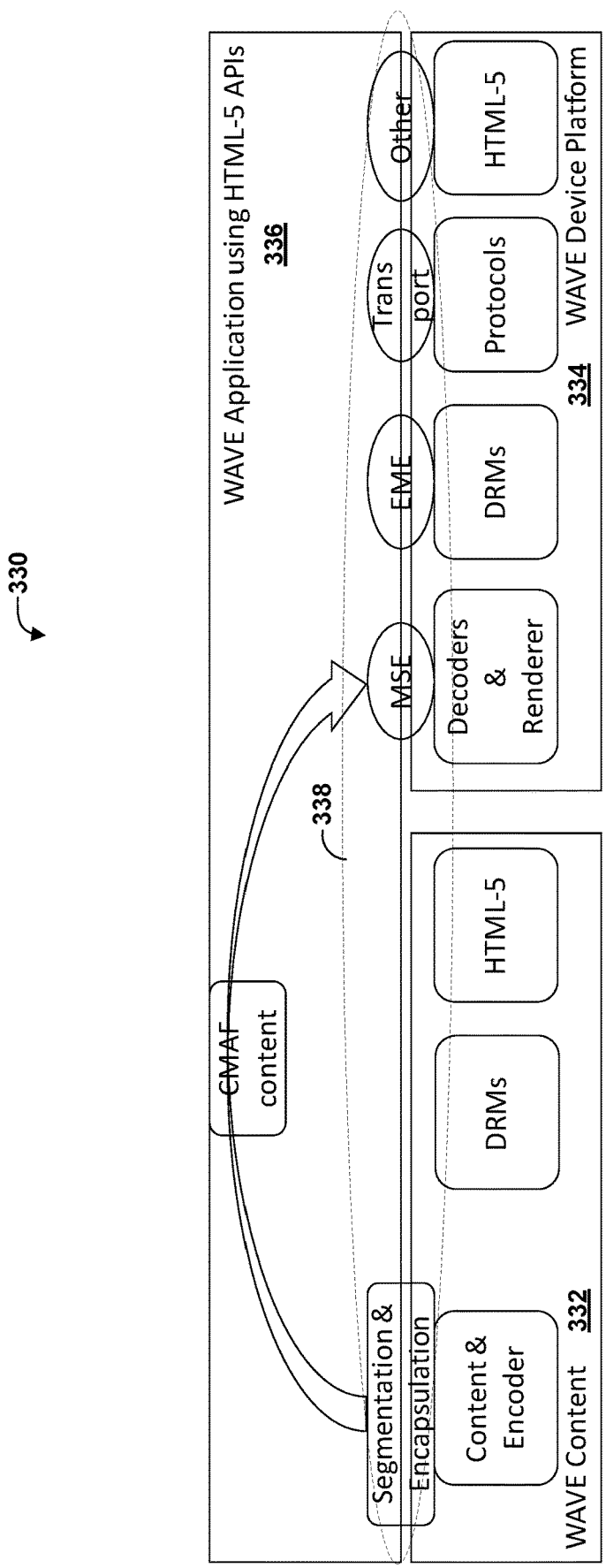
FIG. 10 is a conceptual diagram illustrating an example decomposition within a WAVE application using HTML-5 APIs between platform, content, and application, each of which may use data according to the techniques of this disclosure.

FIG. 10 is a conceptual diagram illustrating an example decomposition 330 within a WAVE application 336 using HTML-5 application programming interfaces (APIs) 338 between platform 332, content 334, and application 336, each of which may use data according to the techniques of this disclosure. WAVE device platform 334 may have a set of capabilities that are accessible for application 336 through HTML-5 APIs 338 and detailed codec capabilities. WAVE content 332 may be played on WAVE device platform 334 within WAVE application 336. WAVE application 336 may use the capabilities of WAVE platform device 334 for media services.

Figure 11:
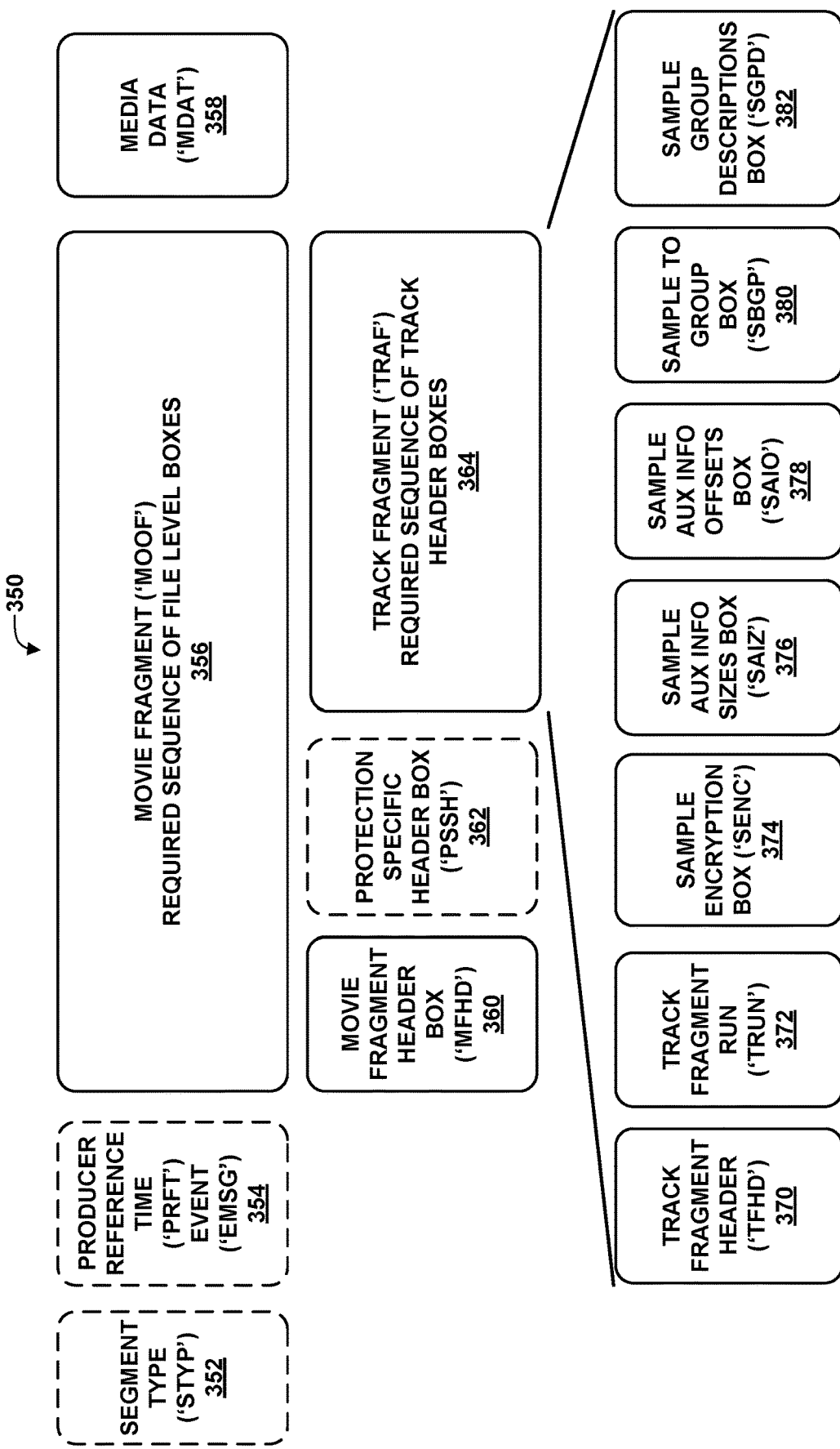
FIG. 11 is a conceptual diagram illustrating an example box sequence and containment of a CMAF chunk.

FIG. 11 is a conceptual diagram illustrating an example box sequence and containment of a CMAF chunk 350. In this example, lower boxes indicate containment in the box above. That is, CMAF chunk includes segment type ('styp') box 352, producer reference time ('prft') event ('emsg') 354, movie fragment ('moof') box 356, and media data ('mdat') box. Moof box 356, in turn, includes movie fragment header ('mfhd') box 360, protection specific header ('pssh') box 362, and track fragment ('traf') box 364. The sequence of boxes contained in the traf box 364 as shown in FIG. 11 is one example. In this example, traf box 364 includes track fragment header ('tfhd') box 370, track fragment run ('trun') box 372, sample encryption ('senc') box 374, sample auxiliary information sizes ('saiz') box 376, sample auxiliary information offsets ('saio') box 378, sample to group ('sbgp') box 380, and sample group descriptions ('sgpd') box 382. Boxes shown with dashed outlines, such as styp box 352, prtf emsg 354, and pssh box 362, may be optional. Certain boxes of traf box 364 as shown in the bottom row are conditionally required when encryption is used, in some examples.

In one example, any CMAF Chunk or CMAF Fragment that contains the initial samples of a CMAF Fragment are to conform to the CMAF Segment brand 'cmff' and the brand should be signaled in the 'styp.'

CMAF Headers, CMAF Fragments, and CMAF Chunks may be packaged and referenced as CMAF Addressable Media Objects for storage and delivery, as described in Section 6.7 of the CMAF Media Object Model. Each CMAF Addressable Media Object may be referenced as a Resource by an external specification, e.g. MPEG DASH.

The CMAF Header, CMAF Chunks and CMAF Fragments may be made available as CMAF Addressable Resources by simple transformation means, for example:
Directly,
By concatenating CMAF Fragments and sending as CMAF Segment, and/or
By concatenating CMAF Header with all CMAF Fragments, possibly adding a SegmentIndexBox.

In CMAF fragment mode, a CMAF header may be available as an addressable object. In this mode, the CMAF Fragment may be directly made available as a CMAF Addressable Media Object.

In CMAF segment mode, CMAF segments may be used as discussed above, e.g., with respect to Table 4 and FIG. 7. A CMAF segment may be defined as a CMAF Addressable Media Object that contains one or more complete CMAF Fragments in presentation order. In some examples:
1. A CMAF Segment may contain the Samples of each CMAF Fragment divided into multiple movie fragments sequenced in decode order.
2. A CMAF Segment may include a SegmentTypeBox preceding the first MovieFragmentBox of each CMAF Fragment. The SegmentTypeBox MAY include the CMAF Segment brand 'cmfs', and any compatible brands listed in the FileTypeBox of the CMAF Track's CMAF Header.

In CMAF chunk mode, the CMAF Header may be available an addressable object. Each CMAF Fragment, in this mode, may be included in one or more CMAF Chunks. The CMAF Chunk may be directly made available as a CMAF Addressable Media Object. The initial CMAF may include two CMAF Segment brands, 'cmff and cmfl', to signal the compatibility to the initial part of the CMAF Fragment as well as to the CMAF chunk. Non-initial CMAF Chunks may include the CMAF Segment brand 'cmfl' to signal the compatibility to this segment format.

A CMAF track file may be a CMAF Addressable Media Object defined to be a CMAF Track stored as a single track in an ISO BMFF file, with the first CMAF Fragment baseMediaDecodeTime equal to zero. The CMAF Header and all CMAF Fragments may be included in a single CMAF Track File. In some examples, a CMAF track file conforms to the following constraints:
1. Additional boxes, such as SegmentIndexBoxes, may be present between the CMAF Header and the first CMAF Fragment.
2. If SegmentIndexBoxes exist, each subsegment referenced in the SegmentIndexBox shall be a single CMAF Fragment contained in the CMAF Track File.
3. Emsg and prtf boxes contained in CMAF Fragments are maintained in the track file. If an emsg or prtf is maintained for a CMAF Fragment, then the SegmentIndexBox shall reference the start of the CMAF fragment, i.e., the earlier of prtf or any emsg.
4. A video CMAF Track File may contain an offset edit list to adjust the earliest presentation time of the first presented sample to baseMediaDecodeTime of zero by subtracting any composition delay added by the use of a v0 TrackRunBox using positive composition offset values to reorder video frames from decode order to presentation order. See 7.5.12 of ISO/IEC 23000-19.
5. A v1 TrackRunBox using negative composition offsets MAY be used to adjust the composition time of the earliest presented video Sample in each CMAF Fragment to its BaseMediaDecodeTime, and the earliest video Sample in the CMAF Track File to zero, without using an offset edit list.

Figure 12:
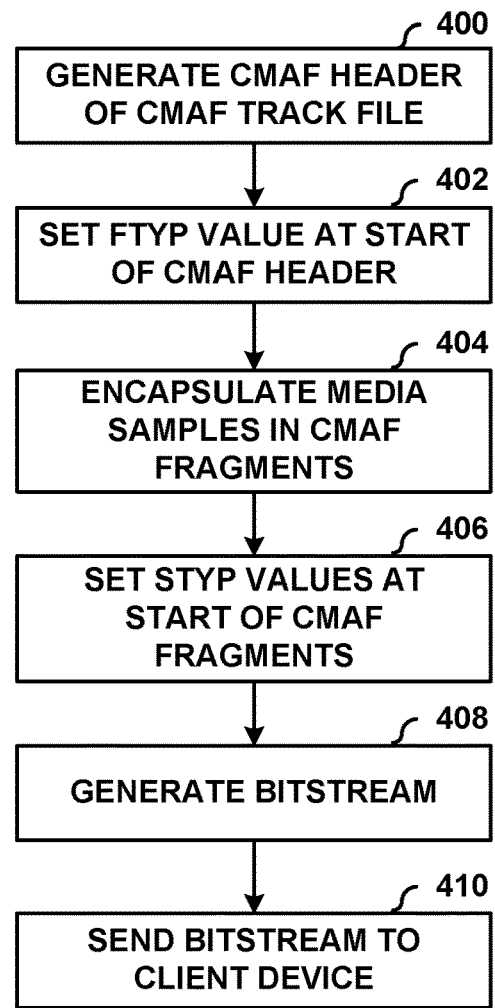
FIG. 12 is a flowchart illustrating an example method of generating a bitstream in accordance with the techniques of this disclosure.

FIG. 12 is a flowchart illustrating an example method of generating a bitstream in accordance with the techniques of this disclosure. The method of FIG. 12 is explained with respect to content preparation device 20 (FIG. 1). However, it should be understood that other devices may be configured to perform this or a similar method. For example, server device 60 may perform some or all steps of the method of FIG. 12.

Initially, audio encoder 26 and video encoder 28 (FIG. 1) encode media data, such as audio or video data respectively, to form encoded samples of media data. Encapsulation unit 30 (FIG. 1) then receives the encoded samples of media data and generates a bitstream including the encoded samples formatted according to CMAF in accordance with the techniques of this disclosure. In particular, encapsulation unit 30 generates a CMAF header of a CMAF track file (400). Encapsulation unit 30 may generate the CMAF header according to Table 3 above. For example, encapsulation unit 30 may set a file type (ftyp) value of the CMAF header at the start of the CMAF header (402). Encapsulation unit 30 may also generate a movie (moov) box of the CMAF header, e.g., including the elements of moov box 154 of FIG. 4.

Encapsulation unit 30 may then encapsulate the encoded media samples in respective CMAF fragments (404). In various examples, the CMAF fragments may correspond to CMAF fragments only, CMAF fragments included in CMAF segments, or CMAF fragments including CMAF chunks. Accordingly, encapsulation unit 30 may set segment type (styp) values at the start of the CMAF fragments, to indicate starts of the CMAF fragments and types for the CMAF fragments (e.g., CMAF fragments only, CMAF segments, or CMAF chunks). As noted above, the value "cmfs" may represent a CMAF segment, the value "cmff" may represent a CMAF fragment only, and the value "cmfl" may represent a CMAF chunk. Encapsulation unit 30 may set the styp values in respective moof boxes of the CMAF fragments.

Encapsulation unit 30 may then generate a bitstream (408) including the CMAF header and CMAF fragments, and send the bitstream to a client device (410), such as client device 40 (FIG. 1). In some examples, content preparation device 20 may send the bitstream to server device 60, which may then send the bitstream to client device 40.

In this manner, the method of FIG. 12 represents an example of a method of generating a bitstream, the method including generating, by a processor implemented in circuitry, a Common Media Application Format (CMAF) header of a CMAF track file; setting, by the processor, a value for a file type (FTYP) value of the CMAF header indicating the start of the CMAF header; encapsulating, by the processor, one or more samples of media data in one or more CMAF fragments following the CMAF header of the CMAF track file; and generating, by the processor, a bitstream including the CMAF header and the CMAF track file, the one or more CMAF fragments following the CMAF header in the CMAF track file.

Figure 13:
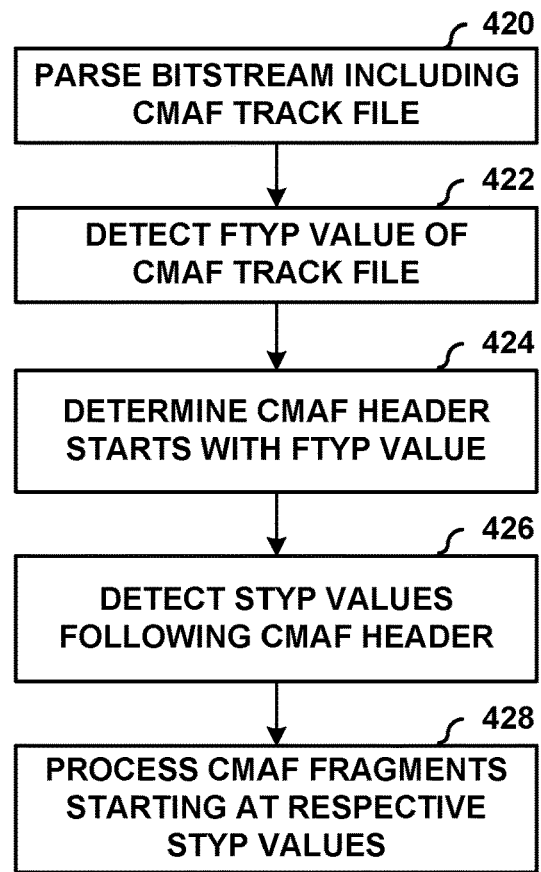
FIG. 13 is a flowchart illustrating an example of a method of processing media data in accordance with the techniques of this disclosure.

FIG. 13 is a flowchart illustrating an example of a method of processing media data in accordance with the techniques of this disclosure. The method of FIG. 13 is explained with respect to client device 40 of FIG. 1. However, it should be understood that other devices may be configured to perform this or a similar method in accordance with the techniques of this disclosure.

Initially, retrieval unit 52 (FIG. 1) of client device 40 parses a bitstream including a CMAF track file (420). It should be understood that retrieval unit 52 may initially request the bitstream from, e.g., server device 60 or content preparation device 20 (FIG. 1). While parsing the bitstream, retrieval unit 52 may detect a file type (ftyp) value of the CMAF track file (422). As shown in Table 3 above, the ftyp value may be at the start of a CMAF header of the CMAF track file. Accordingly, retrieval unit 52 may determine that the CMAF header starts with the ftyp value (424). Retrieval unit 52 may further determine that the rest of the CMAF header (e.g., a moov box) follows the ftyp value.

Retrieval unit 52 may, therefore, determine that one or more CMAF fragments of the CMAF track file follow the CMAF header (and any sidx boxes, if present, e.g., as shown in Table 2 above and in FIG. 4). In particular, retrieval unit 52 may continue parsing the bitstream following the CMAF header and detect one or more segment type (styp) values following the CMAF header (426). Retrieval unit 52 may detect the styp values in respective moof boxes of the CMAF fragments. In accordance with the techniques of this disclosure, retrieval unit 52 may determine that each of the styp values represents the start of a corresponding CMAF fragment. Moreover, retrieval unit 52 may determine types for the CMAF fragments from the respective styp values. As discussed above, in some examples, the value "cmfs" for styp may represent a CMAF segment, the value "cmff" for styp may represent a CMAF fragment only, and the value "cmfl" for styp may represent a CMAF chunk.

Therefore, retrieval unit 52 may process the corresponding CMAF fragments starting at the respective styp values according to the styp values (428). For example, retrieval unit 52 may determine whether a CMAF fragment only follows the styp value, whether one or more CMAF fragments are to be expected as part of a CMAF segment (e.g., as shown in FIG. 7), or whether the CMAF fragment includes one or more CMAF chunks (e.g., as shown in FIG. 8B).

In this manner, the method of FIG. 13 represents an example of a method of processing media data, the method including parsing, by a processor implemented in circuitry, a bitstream including data formatted according to Common Media Application Format (CMAF), detecting, by the processor and during the parsing, a file type (FTYP) value for a CMAF track file of the bitstream, determining, by the processor, that a CMAF header of the CMAF track file starts with the FTYP value, and processing, by the processor, one or more CMAF fragments following the CMAF header of the CMAF track file.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code, and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of processing media data, the method comprising:
    parsing, by a processor implemented in circuitry, a bitstream including data formatted according to Common Media Application Format (CMAF);
    detecting, by the processor and during the parsing, a file type (FTYP) value for a CMAF track file of the bitstream;
    determining, by the processor, that a CMAF header of the CMAF track file starts with the FTYP value; and
    processing, by the processor, one or more CMAF fragments following the CMAF header of the CMAF track file, wherein processing the one or more CMAF fragments comprises:
        detecting one or more segment type (STYP) values in the bitstream;
        determining that each of the one or more STYP values corresponds to a start of a respective one of the CMAF fragments;
        determining that at least one of the STYP values comprises a value indicating presence of a first sample of the respective one of the CMAF fragments; and
        processing each of the CMAF fragments starting from the corresponding STYP value, comprising, in response to determining that the at least one of the STYP values comprises the value indicating the presence of the first sample of the respective one of the CMAF fragments, processing data of the bitstream following the at least one of the STYP values as corresponding to samples of the corresponding one of the CMAF fragments.

2. The method of claim 1, wherein determining that at least one of the STYP values comprises a value indicating presence of a first sample of the respective one of the CMAF fragments comprises determining that the at least one of the STYP values has a value of "cmff".

3. The method of claim 1, further comprising:
    determining that at least one of the STYP values for a corresponding one of the CMAF fragments has a value indicating that the corresponding one of the CMAF fragments includes a CMAF chunk; and
    processing the CMAF chunk in response to determining that the at least one of the STYP values has the value indicating that the corresponding one of the CMAF fragments includes the CMAF chunk.

4. The method of claim 3, wherein the value for the at least one of the STYP values for the corresponding one of the CMAF fragments comprises "cmfl".

5. The method of claim 1, further comprising:
    determining that at least one of the STYP values for a corresponding one of the CMAF fragments has a value indicating that the corresponding one of the CMAF fragments is included in a CMAF segment of the CMAF track file; and
    processing the CMAF segment in response to determining that the at least one of the STYP values has the value indicating that the corresponding one of the CMAF fragments is included in the CMAF segment.

6. The method of claim 5, wherein the value for the at least one of the STYP values for the corresponding one of the CMAF fragments comprises "cmfs".

7. The method of claim 1, wherein processing each of the CMAF fragments comprises determining that data following the CMAF header represents the one or more CMAF fragments in response to detection of the FTYP value.

8. A device for processing media data, the device comprising:
    a memory for storing media data; and
    one or more processors implemented in circuitry and configured to:
        parse a bitstream including data formatted according to Common Media Application Format (CMAF);
        detect, during the parsing, a file type (FTYP) value for a CMAF track file of the bitstream;
        determine that a CMAF header of the CMAF track file starts with the FTYP value; and
        process one or more CMAF fragments following the CMAF header of the CMAF track file, wherein to process the one or more CMAF fragments, the one or more processors are configured to:
            detect one or more segment type (STYP) values in the bitstream;
            determine that each of the one or more STYP values corresponds to a start of a respective one of the CMAF fragments;
            determine that at least one of the STYP values comprises a value indicating presence of a first sample of the respective one of the CMAF fragments; and
            process each of the CMAF fragments starting from the corresponding STYP value, wherein to process each of the CMAF fragments, the one or more processors are configured to, in response to determining that the at least one of the STYP values comprises the value indicating the presence of the first sample of the respective one of the CMAF fragments, process data of the bitstream following the at least one of the STYP values as corresponding to samples of the corresponding one of the CMAF fragments.

9. The device of claim 8, wherein to determine that at least one of the STYP values comprises a value indicating presence of a first sample of the respective one of the CMAF fragments, the one or more processors are configured to determine that the at least one of the STYP values has a value of "cmff".

10. The device of claim 8, wherein the one or more processors are further configured to:
 determine that at least one of the STYP values for a corresponding one of the CMAF fragments has a value indicating that the corresponding one of the CMAF fragments includes a CMAF chunk; and
 process the CMAF chunk in response to determining that the at least one of the STYP values has the value indicating that the corresponding one of the CMAF fragments includes the CMAF chunk.

11. The device of claim 10, wherein the value for the at least one of the STYP values for the corresponding one of the CMAF fragments comprises "cmfl."

12. The device of claim 8, wherein the one or more processors are further configured to:
 determine that at least one of the STYP values for a corresponding one of the CMAF fragments has a value indicating that the corresponding one of the CMAF fragments is included in a CMAF segment of the CMAF track file; and
 process the CMAF segment in response to determining that the at least one of the STYP values has the value indicating that the corresponding one of the CMAF fragments is included in the CMAF segment.

13. The device of claim 12, wherein the value for the at least one of the STYP values for the corresponding one of the CMAF fragments comprises "cmfs".

14. The device of claim 8, wherein to process each of the CMAF fragments, the one or more processors are configured to determine that data following the CMAF header represents the one or more CMAF fragments in response to detection of the FTYP value.

15. A computer-readable storage medium having stored thereon instructions that, when executed, cause a processor to:
 parse a bitstream including data formatted according to Common Media Application Format (CMAF);
 detect, during the parsing, a file type (FTYP) value for a CMAF track file of the bitstream;
 determine that a CMAF header of the CMAF track file starts with the FTYP value; and
 processing, by the processor, one or more CMAF fragments following the CMAF header of the CMAF track file, wherein the instructions that cause the processor to process the one or more CMAF fragments comprise instructions that cause the processor to:
  detect one or more segment type (STYP) values in the bitstream;
  determine that each of the one or more STYP values corresponds to a start of a respective one of the CMAF fragments;
  determine that at least one of the STYP values comprises a value indicating presence of a first sample of the respective one of the CMAF fragments; and
  process each of the CMAF fragments starting from the corresponding STYP value, including instructions that cause the processor to, in response to determining that the at least one of the STYP values comprises the value indicating the presence of the first sample of the respective one of the CMAF fragments, process data of the bitstream following the at least one of the STYP values as corresponding to samples of the corresponding one of the CMAF fragments.

16. The computer-readable storage medium of claim 15, wherein the instructions that cause the processor to determine that at least one of the STYP values comprises a value indicating presence of a first sample of the respective one of the CMAF fragments comprise instructions that cause the processor to determine that the at least one of the STYP values has a value of "cmff".

17. The computer-readable storage medium of claim 15, further comprising instructions that cause the processor to:
 determine that at least one of the STYP values for a corresponding one of the CMAF fragments has a value indicating that the corresponding one of the CMAF fragments includes a CMAF chunk; and
 process the CMAF chunk in response to determining that the at least one of the STYP values has the value indicating that the corresponding one of the CMAF fragments includes the CMAF chunk.

18. The computer-readable storage medium of claim 15, further comprising instructions that cause the processor to:
 determine that at least one of the STYP values for a corresponding one of the CMAF fragments has a value indicating that the corresponding one of the CMAF fragments is included in a CMAF segment of the CMAF track file; and
 process the CMAF segment in response to determining that the at least one of the STYP values has the value indicating that the corresponding one of the CMAF fragments is included in the CMAF segment.

19. The computer-readable storage medium of claim 15, wherein the instructions that cause the processor to process each of the CMAF fragments comprise instructions that cause the processor to determine that data following the CMAF header represents the one or more CMAF fragments in response to detection of the FTYP value.

20. A device for processing media data, the device comprising:
 means for parsing a bitstream including data formatted according to Common Media Application Format (CMAF);
 means for detecting, during the parsing, a file type (FTYP) value for a CMAF track file of the bitstream;
 means for determining that a CMAF header of the CMAF track file starts with the FTYP value; and
 means for processing one or more CMAF fragments following the CMAF header of the CMAF track file, wherein the means for processing the one or more CMAF fragments comprises:
  means for detecting one or more segment type (STYP) values in the bitstream;
  means for determining that each of the one or more STYP values corresponds to a start of a respective one of the CMAF fragments;
  means for determining that at least one of the STYP values comprises a value indicating presence of a first sample of the respective one of the CMAF fragments; and
  means for processing each of the CMAF fragments starting from the corresponding STYP value, comprising means for processing, in response to determining that the at least one of the STYP values comprises the value indicating the presence of the first sample of the respective one of the CMAF fragments, data of the bitstream following the at least one of the STYP values as corresponding to samples of the corresponding one of the CMAF fragments.

* * * * *